United States Patent
Jeong et al.

(10) Patent No.: US 11,670,294 B2
(45) Date of Patent: Jun. 6, 2023

(54) METHOD OF GENERATING WAKEUP MODEL AND ELECTRONIC DEVICE THEREFOR

(71) Applicant: Samsung Electronics Co., Ltd., Gyeonggi-do (KR)

(72) Inventors: Jaehoon Jeong, Gyeonggi-do (KR); Sukanya Sonowal, Gyeonggi-do (KR); Daewoong Song, Gyeonggi-do (KR); Shinjae Kang, Gyeonggi-do (KR); Junseok Oh, Gyeonggi-do (KR); Sangho Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 17/067,903

(22) Filed: Oct. 12, 2020

(65) Prior Publication Data

US 2021/0110825 A1    Apr. 15, 2021

(51) Int. Cl.
  *G10L 15/22*    (2006.01)
  *G10L 15/183*    (2013.01)
(52) U.S. Cl.
  CPC ........ *G10L 15/22* (2013.01); *G10L 2015/223* (2013.01)
(58) Field of Classification Search
  None
  See application file for complete search history.

(56) References Cited

U.S. PATENT DOCUMENTS

| 8,725,800 | B1 | 5/2014 | Chan et al. |
| 8,745,261 | B1 | 6/2014 | Chan et al. |
| 8,747,232 | B1 | 6/2014 | Quan et al. |

(Continued)

FOREIGN PATENT DOCUMENTS

| JP | 11-055799 A | 2/1999 |
| JP | 2009-146263 A | 7/2009 |

(Continued)

OTHER PUBLICATIONS

Seyedmahdad Mirsamadi, John H.L. Hansen; "A Study on Deep Neural Network Acoustic Model Adaptation for Robust Far-Field Speech Recognition"; Center for Robust Speech Systems(CRSS); Sep. 6-10, 2015, Dresden, Germany; pp. 2430-2434.

(Continued)

*Primary Examiner* — Seong-Ah A Shin
(74) *Attorney, Agent, or Firm* — Cha & Reiter, LLC

(57) ABSTRACT

In accordance with an aspect of the disclosure, an electronic device comprises a first audio receiving circuit; a communication circuit; at least one processor operatively connected to the first audio receiving circuit and the communication circuit; and a memory operatively connected to the at least one processor, wherein the memory stores one or more instructions that, when executed, cause the at least one processor to: obtain first audio data, wherein the first audio data is based on a user utterance recorded by an external electronic device, through the communication circuit; convert the first audio data into second audio data, using a first transfer function of the first audio receiving circuit; and generate a wakeup model using the second audio data, the wakeup model configured to verify a wakeup word associated with the first audio data.

20 Claims, 13 Drawing Sheets

(56) References Cited

U.S. PATENT DOCUMENTS

| | | | |
|---|---|---|---|
| 9,002,829 | B2 | 4/2015 | Chan et al. |
| 9,021,120 | B2 | 4/2015 | Chan et al. |
| 9,037,685 | B2 | 5/2015 | Welingkar et al. |
| 9,123,347 | B2 | 9/2015 | Kim et al. |
| 9,786,296 | B2 | 10/2017 | Kim et al. |
| 9,934,781 | B2 | 4/2018 | Subhojit et al. |
| 10,504,511 | B2 | 12/2019 | Wang et al. |
| 10,679,619 | B2 | 6/2020 | Subhojit et al. |
| 11,112,389 | B1 * | 9/2021 | Robinson ................. G01H 7/00 |
| 11,445,107 | B2 * | 9/2022 | Colafrancesco ....... G08C 23/04 |
| 2008/0114830 | A1 | 5/2008 | Welingkar et al. |
| 2010/0217594 | A1 | 8/2010 | Sawada et al. |
| 2013/0054234 | A1 | 2/2013 | Kim et al. |
| 2014/0136611 | A1 | 5/2014 | Chan et al. |
| 2014/0189015 | A1 | 7/2014 | Chan et al. |
| 2014/0358535 | A1 | 12/2014 | Lee et al. |
| 2015/0012279 | A1 | 1/2015 | Kim et al. |
| 2016/0267913 | A1 * | 9/2016 | Kim ....................... G10L 17/24 |
| 2017/0053650 | A1 * | 2/2017 | Ogawa ................... G10L 25/51 |
| 2019/0027138 | A1 * | 1/2019 | Wang ..................... G10L 15/22 |
| 2021/0210075 | A1 * | 7/2021 | Kim ...................... G10L 15/183 |

FOREIGN PATENT DOCUMENTS

| | | |
|---|---|---|
| KR | 10-2004-0068763 A | 8/2004 |
| KR | 10-2014-0139982 A | 12/2014 |
| KR | 10-2016-0001965 A | 1/2016 |
| WO | 2019/019812 A1 | 1/2019 |

OTHER PUBLICATIONS

Ehsan Variani et al.; "Deep Neural Networks For Small Footprint Text-Dependent Speaker Verification"; 2014 IEEE International Conference on Acoustic, Speech and Signal Processing (ICASSP); pp. 4080-4084.

Najim Dehak et al.; "Front-End Factor Analysis For Speaker Verification"; IEEE Transactions on Audio, Speech and Language Processing; pp. 1-11.

Shu-Nung Yao et al.; "Head-Related Transfer Function Selection Using Neural Networks"; Archives of Acoustics, vol. 42, No. 3, pp. 365-373 (2017).

C.J. Leggetter and P.C. Woodland; "Maximum likelihood linear regression for speaker adaptation of continuous density hidden Markov models"; Computer Speech and Language (1995) 9. 171-185.

Richard O. Duda; "Modeling Head Related Transfer Functions"; Department of Electrical Engineering, San Jose State University; email: duda@ai.sri.com; 5 pages.

Douglas A. Reynolds et al.; Speaker Verification Using Adapted Gaussian Mixture Models; Digital Signal Processing vol. 10, 19-41 (2000) http://www.idealibrary.com.

International Search Report dated Jan. 29, 2021.

* cited by examiner

METHOD OF GENERATING WAKEUP MODEL AND ELECTRONIC DEVICE THEREFOR

CROSS-REFERENCE TO RELATED APPLICATION(S)

This application is based on and claims priority under 35 U.S.C. § 119 to Korean Patent Application No. 10-2019-0127992, filed on Oct. 15, 2019, in the Korean Intellectual Property Office, the disclosure of which is incorporated by reference herein its entirety.

BACKGROUND

1. Field

The disclosure relates to a method for generating a wakeup model and an electronic device therefor.

2. Description of Related Art

As the number and types of electronic devices supporting Internet access increase, certain electronic devices may be focused on managing the needs of specific users. A plurality of electronic devices may be associated with a single user account, and a user may collectively manage a plurality of electronic devices through a user account. For example, an electronic device may receive a user input (e.g., a voice input) through a voice agent program and may control other electronic devices based on the voice input.

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, an electronic device comprises a first audio receiving circuit; a communication circuit; at least one processor operatively connected to the first audio receiving circuit and the communication circuit; and a memory operatively connected to the at least one processor, wherein the memory stores one or more instructions that, when executed, cause the at least one processor to: obtain first audio data, wherein the first audio data is based on a user utterance recorded by an external electronic device, through the communication circuit; convert the first audio data into second audio data, using a first transfer function of the first audio receiving circuit; and generate a wakeup model using the second audio data, the wakeup model configured to verify a wakeup word associated with the first audio data.

In accordance with another aspect of the disclosure, a method for generating a wakeup model of an electronic device comprises: obtaining first audio data based on a user utterance recorded by an external electronic device; converting the first audio data into second audio data, using a first transfer function of a first audio receiving circuit of the electronic device; and generating a wakeup model using the second data, the wakeup model configured to verify a wakeup word associated with the first audio data.

In accordance with another aspect of the disclosure, a non-transitory computer-readable media stores one or more instructions, wherein the one or more instructions that, when executed, cause at least one processor to: obtain first audio data based on a user utterance recorded by an external electronic device; convert the first audio data to second audio data, using a first transfer function of a first audio receiving circuit of an electronic device; and generate a wakeup model using the second data, the wakeup model configured to verify a wakeup word associated with the first audio data.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The user may cause the voice agent program of the electronic device to operate, using a specified wakeup word. The electronic device may recognize the wakeup word to execute the voice agent program. To recognize the wakeup word, the electronic device may use a wakeup recognition model (hereinafter referred to as a wakeup model). The electronic device may recognize the reception of the wakeup word by processing the wakeup word based on the wakeup model and a specified algorithm (e.g., hidden Markov model (HMM) or artificial neural network). For example, the electronic device may generate a wakeup model by receiving the wakeup word from the user once or more and processing the received wakeup word depending on a specified adaptive training algorithm. In the case of the HMM algorithm, the electronic device may use an adaptive training algorithm such as an expectation-maximization (EM)

algorithm and/or a maximum likelihood linear regression (MLLR) algorithm. When using the artificial neural network, the electronic device may use an adaptive training algorithm such as a feedforward algorithm, a backward-propagation algorithm, and/or a linear transformation algorithm.

For a user to call a voice agent using a wakeup word, a wakeup model needs to be present in an electronic device. Accordingly, the user may need to learn the wakeup word (e.g., a keyword) for the corresponding electronic device. When the user utilizes another electronic device (e.g., when a mobile phone is changed), the user may need to learn the wakeup word for the corresponding electronic device again. In general, wakeup word learning may cause the user to repeatedly say the wakeup word, and thus the user may be reluctant to use a voice agent because the wakeup word learning is repeated.

Certain aspects of the disclosure may address at least the above-mentioned problems and/or disadvantages and to provide at least the advantages described below. Accordingly, an aspect of the disclosure is to provide an electronic device supporting an improved wakeup model converting method.

Hereinafter, certain embodiments of this specification may be described with reference to accompanying drawings. Embodiments and terms used herein are not intended to limit the technologies described in the disclosure to specific embodiments, and it should be understood that the embodiments and the terms include modification, equivalent, and/or alternative on the corresponding embodiments described herein.

Figure 1:
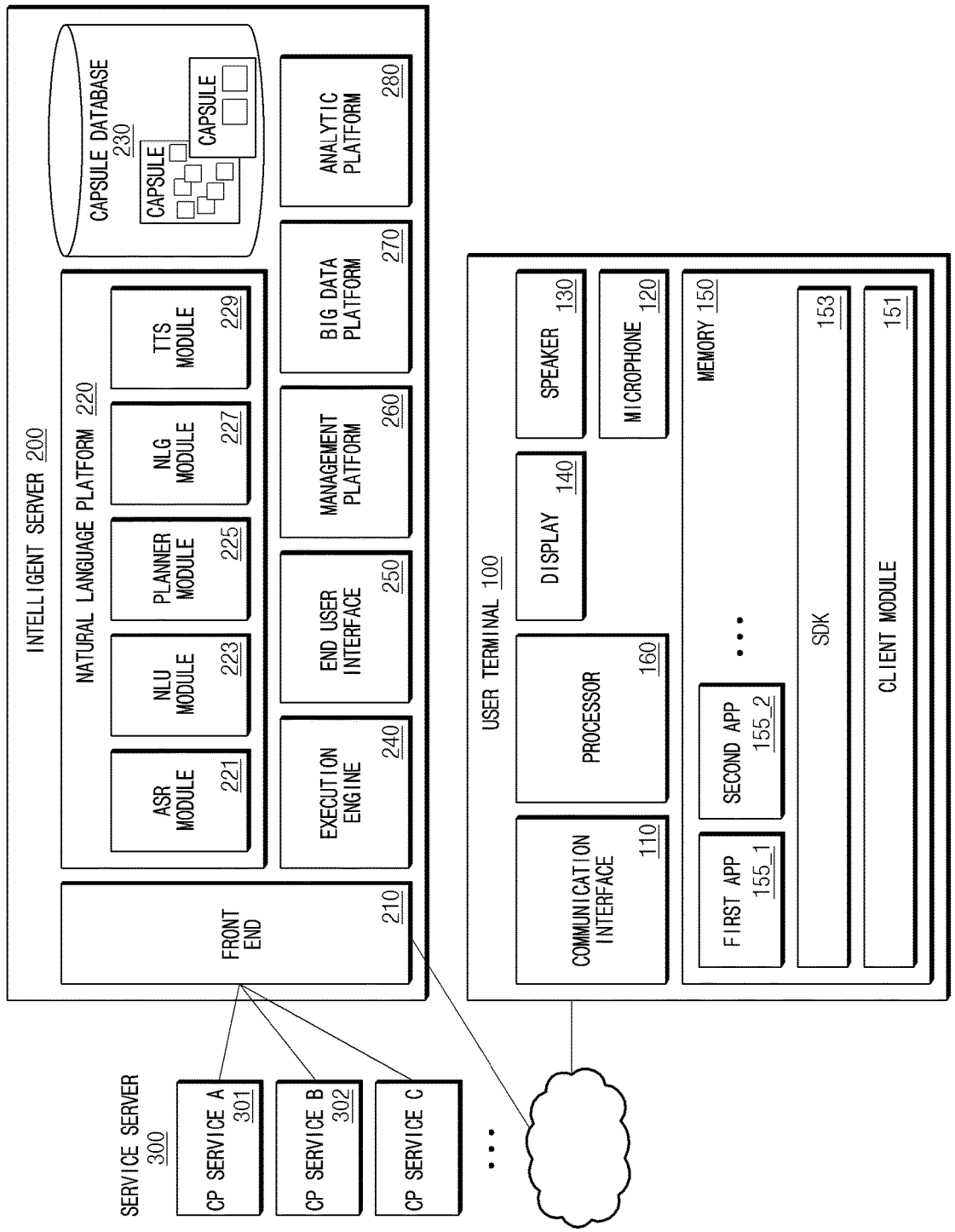
FIG. 1 is a block diagram illustrating an integrated intelligence system, according to an embodiment.

FIG. 1 is a block diagram illustrating an integrated intelligence system, according to an embodiment.

Referring to FIG. 1, an integrated intelligence system according to an embodiment may include a user terminal 100, an intelligence server 200, and a service server 300.

The user terminal 100 can detect a user utterance by the microphone. The microphone converts the user utterance to a voice input. The client module 151 or the Software Development Kit (SDK) 153 transmits the voice input to an intelligent server 200. The intelligent server 200 converts the voice input to text data. The intelligent server 200 can use artificial intelligence to determine a set of actions forming a plan that corresponds to the voice input (as converted to text data). The user terminal 100 receive the plan from the intelligent server 200.

To save power, the user terminal 100 can operate in a low power mode. That is, not all sounds received by the microphone 120 are user utterances, and not all user utterances are intended by the user to be a command. Thus, sending all sounds received by the microphone to the intelligent server 200 would consume a large amount of power, and likely result in very few verified user commands. Accordingly, the user terminal 100 can be configured to listen for a designated wakeup word from the user, which can be followed by an actual user command. When the user terminal 100 detects the wake-up word, and the user terminal 100 can leave the low power mode, and enter into a higher power mode, or a fully powered mode, where subsequent (within a predetermined time period) sounds received by microphone 120 are provided to the intelligent server 120.

The user terminal 100 detects the user's utterance of the wakeup word by comparing signals received from the microphone (voice signal, although it is understood that the voice signal can be an electrical signal representing sounds that do not include a voice) to a wakeup word model.

The wakeup model is generated by having the user provide exemplars of their voice uttering the wakeup word during what is known as the training phase. When the user provides exemplars of their voice uttering the wakeup word, a wakeup word model is generated from the voice signal received from the microphone. Specifically, the wakeup word model determines particularities of known voice signals that are known to represent the wakeup word. The wakeup word model can then be used to determine whether a later received voice signal represents a user utterance of the wakeup word.

It is noted, however, that the user may user several different user terminals 100. Thus, the user terminal 100 that the user is presently using might not have been used for a training phase. As a result, the microphone 120 might not have received exemplars of the user's voice uttering the wakeup word. Rather the user terminal 100 may have received a wakeup word model from another user terminal 100.

It is noted however, that wakeup word models can be dependent on the characteristics of the microphone of the user terminal 100 that was used for the training phase. As a result, the wakeup word model may not work as well with another user terminal 100 with a microphone 120 with different characteristics, such as a different type, and different placement on the user terminal 100. To improve wakeup word detection, the user terminal 100 receives first audio data recorded by an external electronic device, converts the first audio data into second audio data, using a transfer function that corresponds to the microphone 120, and generates a wakeup model using the second audio data.

The user terminal 100 according to an embodiment may be a terminal device (or an electronic device) capable of connecting to Internet, and may be, for example, and not limited to, a mobile phone, a smartphone, a personal digital assistant (PDA), a notebook computer, a television (TV), a white household appliance, a wearable device, a head mounted display (HMD), or a smart speaker.

According to the illustrated embodiment, the user terminal 100 may include a communication interface 110, a microphone 120, a speaker 130, a display 140, a memory 150, or a processor 160. The listed components may be operatively or electrically connected to one another.

The communication interface 110 according to an embodiment may be a transceiver configured to transmit or receive data to or from an external device. The microphone 120 according to an embodiment may receive a sound (e.g., a user utterance) to convert the sound into an electrical signal. The speaker 130 according to an embodiment may output an electrical signal to sound (e.g., voice). The display 140 according to an embodiment may be configured to display an image or a video. The display 140 according to an embodiment may display the graphic user interface (GUI) of a running app (or an application program).

The memory 150 according to an embodiment may store a client module 151, a software development kit (SDK) 153, and a plurality of apps (or applications) 155. The client module 151 and the SDK 153 may constitute a framework (or a solution program) for performing general-purposed functions. Furthermore, the client module 151 or the SDK 153 may constitute the framework for processing a voice input.

The plurality of apps 155 may apps that together form a program for performing a specified function. According to an embodiment, the plurality of apps 155 may include a first app 155_1 and/or a second app 155_2. According to an embodiment, each of the plurality of apps 155 may include instruction(s) for performing a plurality of actions for performing the specified function. For example, the apps may include an alarm app, a message app, and/or a schedule app. According to an embodiment, the plurality of apps 155 may be executed by the processor 160 to sequentially execute at least part of the plurality of actions.

According to an embodiment, the processor 160 may control overall actions of the user terminal 100. For example, the processor 160 may be electrically connected to the communication interface 110, the microphone 120, the speaker 130, and the display 140 to perform a specified action. For example, the processor 160 may include at least one processor. The term "processor" shall be understood to refer to both the singular context and the plural context.

Moreover, the processor 160 according to an embodiment may execute programs stored in the memory 150 to perform a specified function. The processor 160 may execute at least one of the client module 151 or the SDK 153 to perform actions for processing a voice input. The processor 160 may control the actions of the plurality of apps 155 via the SDK 153. The following actions described as the actions of the client module 151 or the SDK 153 may be the actions performed by the execution of the processor 160.

The client module 151 may receive a voice input. For example, the client module 151 may receive a voice signal corresponding to a user utterance detected via the microphone 120. The client module 151 may transmit the received voice input (e.g., a voice input) to the intelligence server 200. The client module 151 may transmit the state information of the user terminal 100 together with the received voice input, to the intelligence server 200. For example, the state information may be the execution state information of an app.

The client module 151 may receive a result corresponding to the received voice input, in response to transmitting the voice input. For example, when the intelligence server 200 is capable of calculating the result corresponding to the received voice input, the client module 151 may receive the result corresponding to the received voice input. The client module 151 may output a graphic corresponding to the received result on the display 140.

The client module 151 may receive a plan corresponding to the received voice input from the intelligence server. The plan may include a plurality of actions that are determined to correspond to the voice input, based on conversion of the voice input to text input. The client module 151 may display the result of executing a plurality of actions of an app on the display 140 depending on the plan. For example, the client module 151 may sequentially display the execution result of a plurality of actions on a display. For another example, the user terminal 100 may display only a part of results (e.g., the result of the last action) of executing a plurality of actions, on the display.

The client module 151 may receive a request for obtaining information necessary to calculate the result corresponding to a voice input, from the intelligence server 200. The client module 151 may transmit the necessary information to the intelligence server 200 in response to the request.

The client module 151 may transmit information about the result of executing a plurality of actions depending on the plan, to the intelligence server 200. The intelligence server 200 may determine that the received voice input is processed correctly, using the result information.

The client module 151 may include a voice recognition module that may recognize a voice input to perform the limited function, via the voice recognition module. For example, the client module 151 may launch an intelligence app for processing a specific voice input by performing an organic action or an action that interacts with a human in a human-like manner, in response to a specified voice input (e.g., wake up!).

The user terminal 100 can use a wakeup model for verifying the a wakeup word from exemplars of user utterances of the wakeup word that were received at another user terminal 100, by converting first audio data into second audio data, using a transfer function associated with the microphone 120.

Intelligence Server

According to certain embodiments, when the user terminal 100 detects the wakeup word, the user terminal 100 can transmit subsequent user utterances to an intelligent server 200. The intelligent server 200 analyzer the user utterances to determine a plan, or a set of functions to effectuate the user's command as stated in the user utterance.

The intelligence server 200 may receive the information associated with a user's voice input from the user terminal 100 over a communication network. The intelligence server 200 may change the data associated with the received voice input to text data and may generate at least one plan for performing a task corresponding based on the text data.

The plan may be generated by an artificial intelligent (AI) system. The AI system may be a rule-based system, or may be a neural network-based system (e.g., a feedforward neural network (FNN) and/or a recurrent neural network (RNN)). Alternatively, the AI system may be a combination of the above-described systems or an AI system different from the above-described system. The plan may be selected from a set of predefined plans or may be generated in real time in response to a user's request. For example, the AI system may select at least one plan of the plurality of predefined plans.

The intelligence server 200 may transmit the result according to the generated plan to the user terminal 100 or may transmit the generated plan to the user terminal 100. The user terminal 100 may display the result according to the plan and the result of executing the action according to the plan, on the display.

The intelligence server 200 may include a front end 210, a natural language platform 220, a capsule database 230, an execution engine 240, an end user interface 250, a management platform 260, a big data platform 270, or an analytic platform 280.

The front end 210 may receive a voice input received from the user terminal 100. The front end 210 may transmit a response corresponding to the voice input to the user terminal 100.

The natural language platform 220 may include an automatic speech recognition (ASR) module 221, a natural language understanding (NLU) module 223, a planner module 225, a natural language generator (NLG) module 227, and/or a text to speech module (TTS) module 229.

The ASR module 221 may convert the voice input received from the user terminal 100 into text data. The NLU module 223 may grasp the intent of the user, using the text data of the voice input. For example, the NLU module 223 may grasp the intent of the user by performing syntactic analysis or semantic analysis. The NLU module 223 may grasp the meaning of words extracted from the voice input by using linguistic features (e.g., syntactic elements) such as morphemes or phrases and may determine the intent of the user by matching the grasped meaning of the words to the intent.

The planner module 225 may generate the plan by using the intent and a parameter, which are determined by the NLU module 223. The planner module 225 may determine a plurality of domains necessary to perform a task, based on the determined intent. The planner module 225 may determine a plurality of actions included in each of the plurality of domains determined based on the intent. The planner module 225 may determine the parameter necessary to perform the determined plurality of actions or the result value output by the execution of the plurality of actions. The parameter and the result value may be defined as a concept of the specified form (or class). As such, the plan may include the plurality of actions and/or a plurality of concepts determined by the intent of the user. The planner module 225 may determine the relationship between the plurality of actions and the plurality of concepts stepwise (or hierarchically). For example, the planner module 225 may determine the execution sequence of the plurality of actions, which are determined based on the user's intent, based on the plurality of concepts. In other words, the planner module 225 may determine the execution sequence of the plurality of actions, based on the parameters necessary to perform the plurality of actions and the result output by the execution of the plurality of actions. As such, the planner module 225 may generate a plan including information (e.g., ontology) of the relationship between the plurality of actions and the plurality of concepts. The planner module 225 may generate the plan, using the information stored in the capsule database 230 storing a set of relationships between concepts and actions.

According to an embodiment, the NLG module 227 may change the specified information into information in the text form. The information changed to the text form may be in the form of a natural language speech. The TTS module 229 according to an embodiment may change information in the text form to information in a voice form.

According to an embodiment, all or part of the functions of the natural language platform 220 may be also implemented in the user terminal 100.

The capsule database 230 may store information about the relationship between the actions and the plurality of concepts corresponding to a plurality of domains. According to an embodiment, the capsule may include a plurality of action objects (or action information) and concept objects (or concept information) included in the plan. According to an embodiment, the capsule database 230 may store the plurality of capsules in the form of a concept action network (CAN). According to an embodiment, the plurality of capsules may be stored in the function registry included in the capsule database 230.

The capsule database 230 may include a strategy registry that stores strategy information necessary to determine a plan corresponding to a voice input. The strategy information may include reference information for determining a single plan when there are a plurality of plans corresponding to the voice input. According to an embodiment, the capsule database 230 may include a follow-up registry that stores the information of the follow-up action for suggesting a follow-up action to the user in the specified context. For example, the follow-up action may include a follow-up utterance. The capsule database 230 may include a layout registry for storing layout information of the information output via the user terminal 100. The capsule database 230 may include a vocabulary registry that stores vocabulary information included in the capsule information. The capsule database 230 may include a dialog registry that stores information about dialog (or interaction) with the user. The capsule database 230 may update the object stored via a developer tool. For example, the developer tool may include a function editor for updating an action object or a concept object. The developer tool may include a vocabulary editor for updating the vocabulary. The developer tool may include a strategy editor that generates and registers a strategy for determining the plan. The developer tool may include a dialog editor that creates a dialog with the user. The developer tool may include a follow-up editor capable of activating the follow-up target and editing the follow-up utterance for providing a hint. The follow-up target may be determined based on the currently set target, the preference of the user, or environment condition. The capsule database 230 according to an embodiment may be also implemented in the user terminal 100.

According to an embodiment, the execution engine 240 may calculate the result, using the generated plan. The end user interface 250 may transmit the calculated result to the user terminal 100. As such, the user terminal 100 may receive the result and may provide the user with the received result. According to an embodiment, the management platform 260 may manage information used by the intelligence server 200. According to an embodiment, the big data platform 270 may collect data of the user. According to an embodiment, the analytic platform 280 may manage the quality of service (QoS) of the intelligence server 200. For example, the analytic platform 280 may manage the component and processing speed (or efficiency) of the intelligence server 200.

According to an embodiment, the service server 300 may provide the user terminal 100 with a specified service (e.g., food order or hotel reservation). According to an embodiment, the service server 300 may be a server operated by the third party. According to an embodiment, the service server 300 may provide the intelligence server 200 with information for generating a plan corresponding to the received voice input. The provided information may be stored in the capsule database 230. Furthermore, the service server 300 may provide the intelligence server 200 with result information according to the plan.

In the above-described integrated intelligence system, the user terminal 100 may provide the user with various intelligent services in response to a user input. The user input may include, for example, an input through a physical button, a touch input, or a voice input.

According to an embodiment, the user terminal 100 may provide a speech recognition service via an intelligence app (or a speech recognition app) stored therein. In this case, for example, the user terminal 100 may recognize the user utterance or the voice input received via the microphone and may provide the user with a service corresponding to the recognized voice input.

According to an embodiment, the user terminal 100 may perform a specified action, based on the received voice input, independently, or together with the intelligence server and/or the service server. For example, the user terminal 100 may execute an app corresponding to the received voice input and may perform the specified action via the executed app.

According to an embodiment, when the user terminal 100 provides a service together with the intelligence server 200 and/or the service server, the user terminal may detect a user utterance, using the microphone 120 and may generate a signal (or voice data) corresponding to the detected user utterance. The user terminal may transmit the voice data to the intelligence server 200, using the communication interface 110.

According to an embodiment, the intelligence server 200 may generate a plan for performing a task corresponding to the voice input or the result of performing an action depending on the plan, as the response to the voice input received from the user terminal 100. For example, the plan may include a plurality of actions for performing the task corresponding to the voice input of the user and/or a plurality of concepts associated with the plurality of actions. The concept may define a parameter to be input for the execution of the plurality of actions or a result value output by the execution of the plurality of actions. The plan may include relationship information between a plurality of actions and a plurality of concepts.

According to an embodiment, the user terminal 100 may receive the response, using the communication interface 110. The user terminal 100 may output the voice signal generated in user terminal 100, to the outside using the speaker 130 or may output an image generated in the user terminal 100, to the outside using the display 140.

Figure 2:
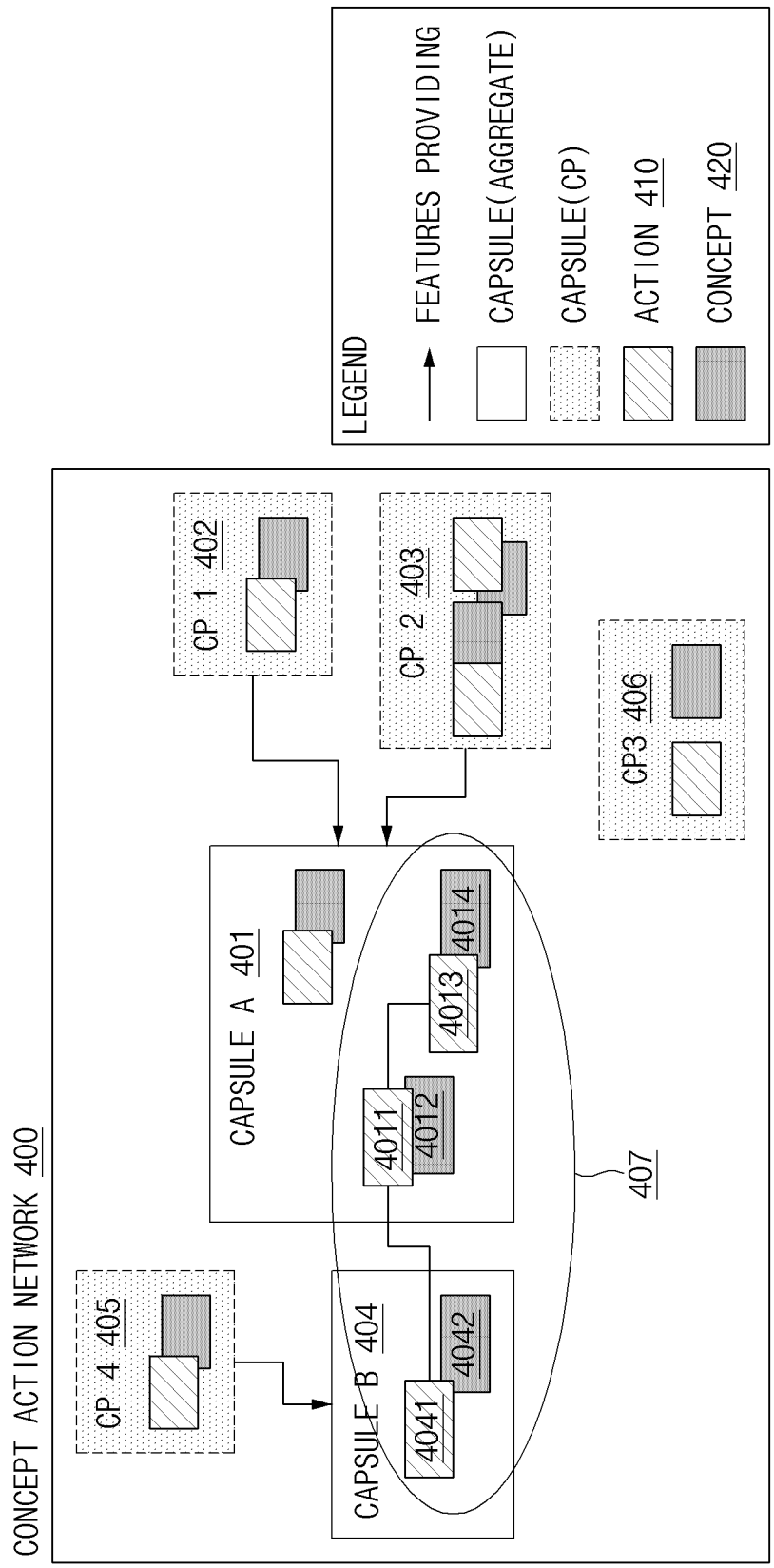
FIG. 2 is a diagram illustrating the form in which relationship information between a concept and an action is stored in a database, according to an embodiment.

FIG. 2 is a diagram illustrating the form in which relationship information between a concept and an action is stored in a database, according to certain embodiments.

The capsule database (e.g., the capsule database 230) of the intelligence server 200 may store a capsule in the form of a concept action network (CAN). The capsule database may store an action for processing a task corresponding to a voice input and a parameter necessary for the action, in the CAN form.

The capsule database may store a plurality capsules capsule A 401 and capsule B 404 respectively corresponding to a plurality of domains (e.g., applications). According to an embodiment, a single capsule (e.g., the capsule A 401) may correspond to a single domain (e.g., a location (geo) or an application). Furthermore, at least one service provider (e.g., CP 1 402 or CP 2 403) for performing the function for the domain associated with the capsule may correspond to the single capsule. According to an embodiment, the single capsule may include at least one or more actions 410 and at least one or more concepts 420 for performing a specified function.

The natural language platform 220 may generate a plan for performing a task corresponding to the received voice input, using the capsule stored in the capsule database. For example, the planner module 225 of the natural language platform may generate a plan, using the capsule stored in the capsule database. For example, the planner module 225 may generate a plan 407, using actions 4011 and 4013 and concepts 4012 and 4014 of the capsule A 410 and an action 4041 and a concept 4042 of the capsule B 404.

Figure 3:
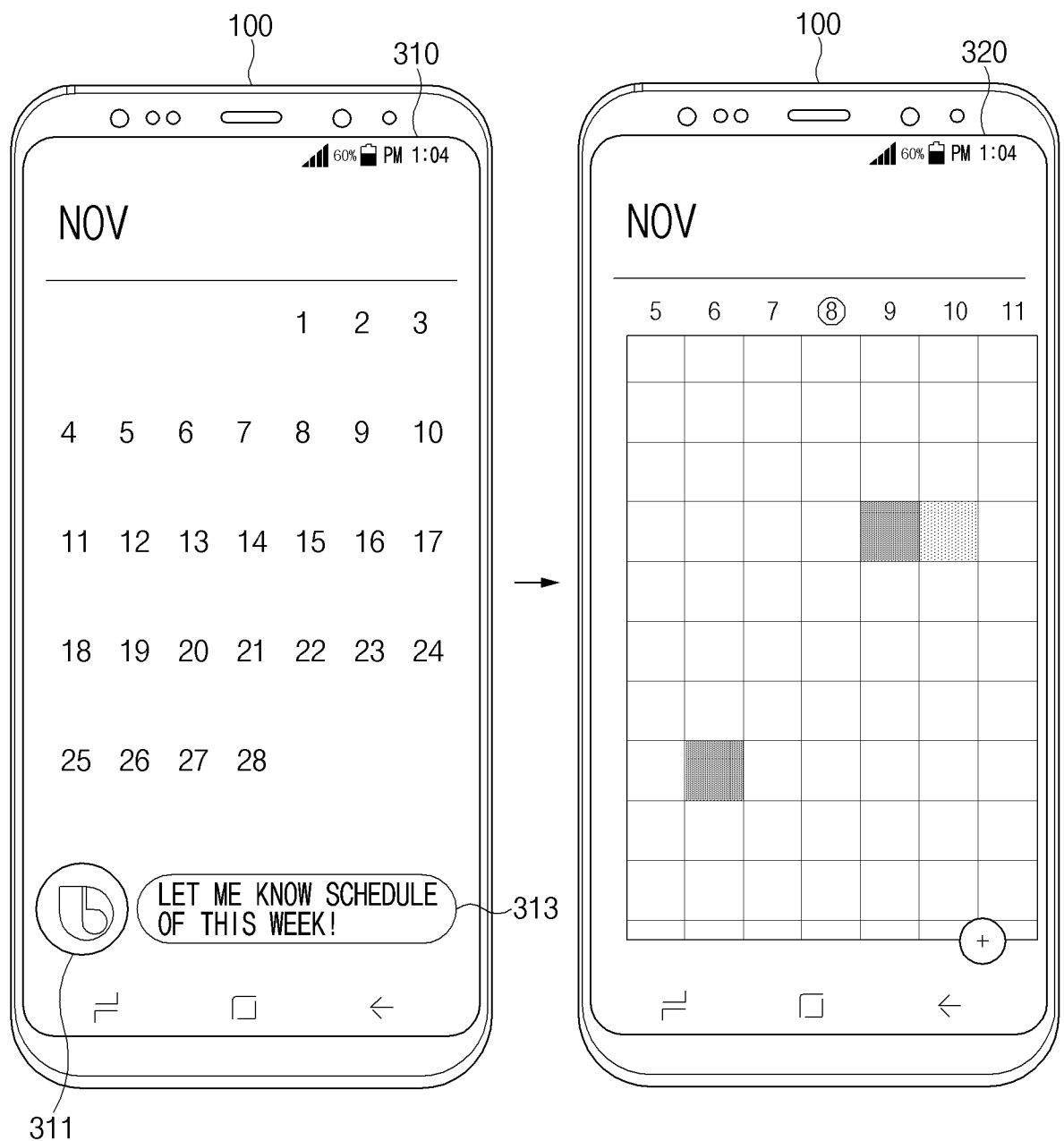
FIG. 3 is a view illustrating a user terminal displaying a screen of processing a voice input received through an intelligence app, according to an embodiment.

FIG. 3 is a view illustrating a screen in which a user terminal processes a voice input received through an intelligence app, according to certain embodiments.

The user terminal 100 may execute an intelligence app to process a user input through the intelligence server 200.

According to an embodiment, in screen 310, when recognizing a specified voice input (e.g., wake up!) or receiving an input via a hardware key (e.g., the dedicated hardware key), the user terminal 100 may launch an intelligence app for processing a voice input. For example, the user terminal 100 may launch an intelligence app in a state where a schedule app is being executed. According to an embodiment, the user terminal 100 may display an object (e.g., an icon) 311 corresponding to the intelligence app, in the display 140. According to an embodiment, the user terminal 100 may receive a voice input by a user utterance. For example, the user terminal 100 may receive a voice input saying that "Let me know the schedule of this week!". According to an embodiment, the user terminal 100 may display a user interface (UI) 313 (e.g., an input window) of an intelligence app, in which text data of the received voice input is displayed, in a display According to an embodiment, in screen 320, the user terminal 100 may display the result corresponding to the received voice input, on the display. For example, the user terminal 100 may receive the plan corresponding to the received user input and may display 'the schedule of this week' on the display depending on the plan.

Figure 4:
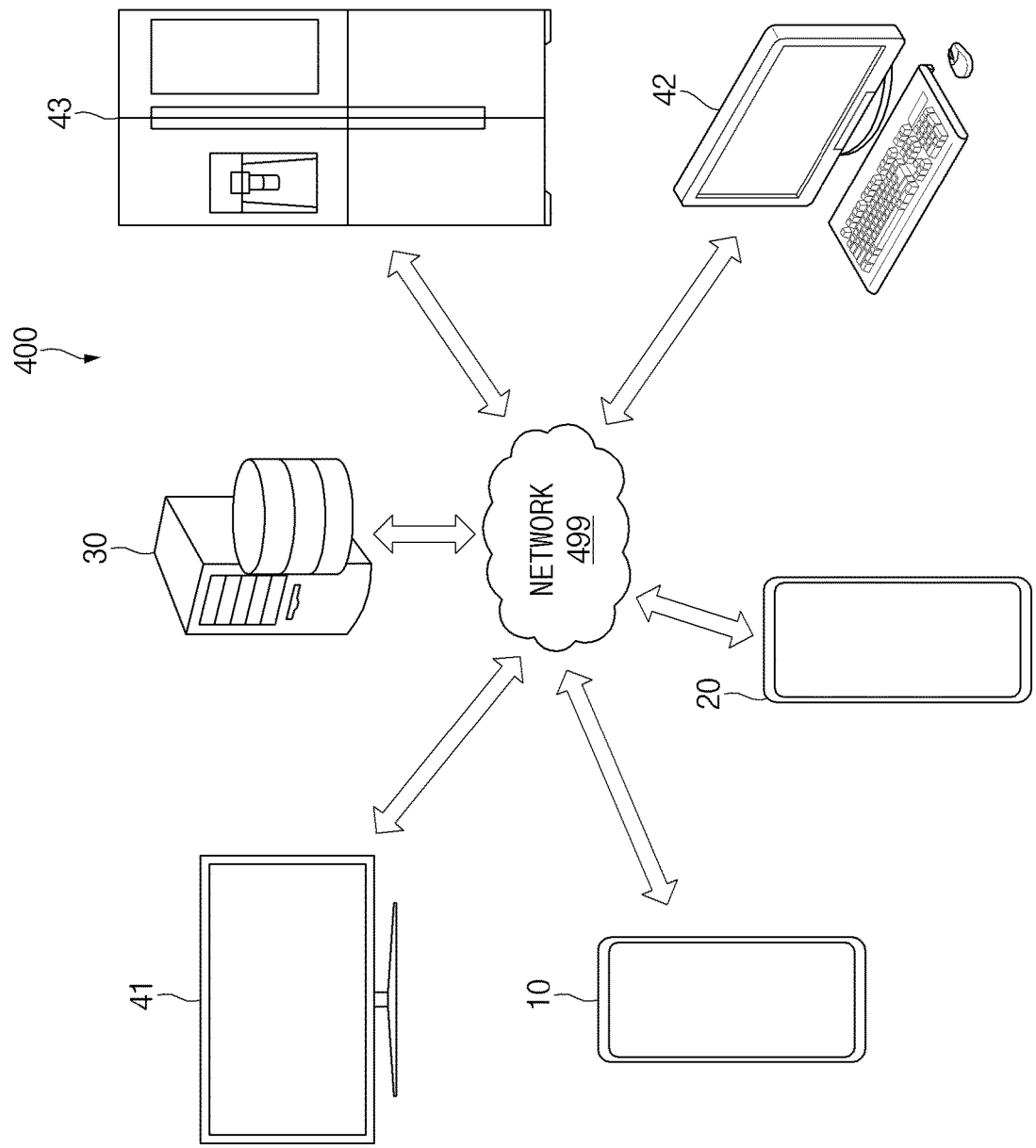
FIG. 4 illustrates a network environment including a plurality of devices according to an embodiment.

FIG. 4 illustrates a network environment 400 including a plurality of devices according to an embodiment. The network environment 400 can includes numerous user terminals, e.g., user terminals 10 and 20. A user terminal 20 can generate a wakeup model based on audio data received at user terminal 10.

Referring to FIG. 4, various electronic devices may communicate through a network 499 (e.g., Internet). For example, the network environment 400 may include a first electronic device 10, a second electronic device 20, a server device 30, a television (TV) 41, a personal computer (PC) 42, and a refrigerator 43. The network environment 400 illustrated in FIG. 4 is exemplary, and embodiments of the disclosure are not limited thereto. For example, at least part of the electronic devices in the network environment 400 may be omitted. The network environment 400 may further include another electronic device not illustrated. In FIG. 4, the first electronic device 10 and the second electronic device 20 are illustrated as mobile phones, but the first electronic device 10 and/or the second electronic device 20 may be different types of electronic devices supporting a voice agent.

For example, each of the first electronic device 10 and the second electronic device 20 may have a structure similar to the structure of the user terminal 100 of FIG. 1. The first electronic device 10 may store a wakeup model based on a user's voice, but the second electronic device 20 may not have a wakeup model based on the user's voice. For example, the user may store the wakeup model in the first electronic device 10 depending on a method described later with reference to FIG. 5.

Figure 5:
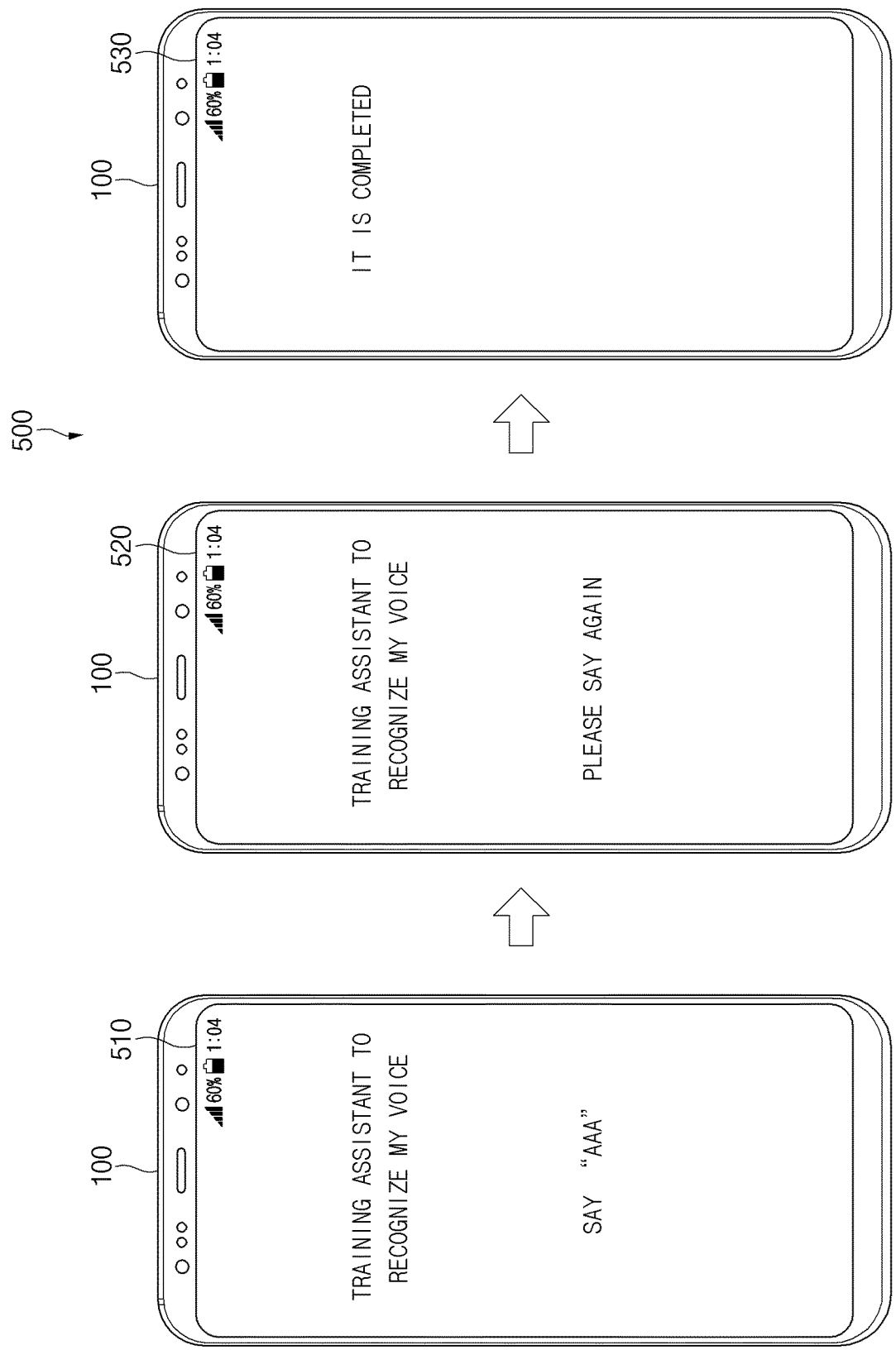
FIG. 5 illustrates a user interface for obtaining a wakeup model according to an embodiment.

FIG. 5 illustrates a user interface 500 for obtaining a wakeup model according to an embodiment.

For example, the user terminal 100 (e.g., the first electronic device 10 of FIG. 4) may provide a user interface 500 for the execution or wakeup of a voice agent. The user terminal 100 may provide a first screen 510. For example, in the example of FIG. 5, a wakeup word may be set to "AAA". The first screen 510 may include a guide that induces a user to utter a wakeup word, thereby receiving exemplars of the user uttering the wakeup word. In this example, it is illustrated that the wakeup word is preset, but embodiments of the disclosure are not limited thereto. The user terminal 100 may use an arbitrary word as a wakeup word. In this case, the first screen 510 may include a guide that induces the user to say a desired wakeup word.

The user terminal 100 may guide the user to repeatedly utter the wakeup word to learn the wakeup word, thereby receiving numerous exemplars. For example, the user terminal 100 may provide a second screen 520. The second screen 520 may include a guide that allows the user to repeat the wakeup word. According to an embodiment, the user terminal 100 may provide the second screen 520 several times such that the user says the wakeup word several times. According to an embodiment, the user terminal 100 may receive a wakeup word once from the user and may generate a wakeup model based on the wakeup word. In this case, the provision of the second screen 520 may be omitted.

When the learning of the wakeup word is completed, the user terminal 100 may provide a third screen 530. For example, the user terminal 100 may learn voice data, which is received once or more and which corresponds to the wakeup word, using HMM algorithm, MLLR algorithm, maximum a posterior (MAP) algorithm, feedforward algorithm, backward-propagation algorithm, and/or linear conversion algorithm. The user terminal 100 may generate a wakeup model corresponding to the corresponding user through learning. For example, the user terminal 100 may remove noise from audio data and then may generate the wakeup model, using the audio data from which the noise is removed.

Returning to FIG. 4, for example, a user may control another electronic device using the first electronic device 10. For a user to control another electronic device, the user may execute (e.g., call) the voice agent of the first electronic device 10. The user may execute the voice agent by saying a specified wakeup word. For example, when a voice is received from the user, the first electronic device 10 may determine whether the specified wakeup word has been received, by comparing the voice with the wakeup model stored in the first electronic device 10. The first electronic device 10 may determine whether a specified wakeup word is received, by processing the received voice and the wakeup model depending on a specified algorithm (e.g., HMM or artificial neural network).

In certain embodiments of the disclosure, it may be determined whether the first electronic device 10 determines whether the specified wakeup word is received while in other embodiments, the first electronic device determines whether the wakeup word is received by a specific user. For example, even though any user says "a specified wakeup word", the first electronic device 10 may wake up the voice agent. For another example, the first electronic device 10 may wake up the voice agent only when the specified wakeup word is said by the specified user.

For example, the user may control the TV 41, using the first electronic device 10. When the specified wakeup word is "Hi Bixby", the user may say "Hi Bixby, turn on the TV" The first electronic device 10 may verify "Hi Bixby" to execute a voice agent, and then may perform a task corresponding to "turn on the TV", using the voice agent. For example, the voice agent may use information from the server device 30 to perform a task corresponding to "turn on the TV".

According to an embodiment, the server device 30 may manage information of other devices and account information. For example, the server device 30 may include the intelligence server 200 of FIG. 1 or may be implemented with a server separate from the intelligence server 200. The server device 30 may include a database including account information and information about a device associated with the account. The first electronic device 10 may obtain information of other electronic devices (e.g., the TV 41, the PC 42, and the refrigerator 43) associated with the account of the first electronic device 10 from the server device 30. For example, information of another electronic device may include identification information and/or capability information.

For example, the voice agent of the first electronic device 10 may transmit information (e.g., an audio file and/or text information converted from the audio file) corresponding to "turn on the TV" to an external server (e.g., the intelligence server 200 of FIG. 1), and may receive a task and/or a path rule for performing the task from the external server. The first electronic device 10 may obtain information of an electronic device associated with the account of the first electronic device 10 from the server device 30, and may control the TV 41 corresponding to the task in the obtained information of the electronic device. For example, the first electronic device 10 may control the TV 41 by directly transmitting a signal to the TV 41 or by transmitting a signal through the server 30. Similarly, the user may also control other electronic devices on the network 499, using the first electronic device 10.

For example, the user of the first electronic device 10 may desire to control other electronic devices, using the second electronic device 20. For example, the user has changed his/her mobile phone from the first electronic device 10 to the second electronic device 20. For another example, the second electronic device 20 may be an IoT device (e.g., a smart speaker) for home, which is employed by the user. According to certain embodiments, the user may generate a wakeup model of the second electronic device 20, using the audio data stored in the first electronic device 10 with respect to the second electronic device 20 instead of learning the wakeup model as described above with reference to FIG. 5.

Figure 6:
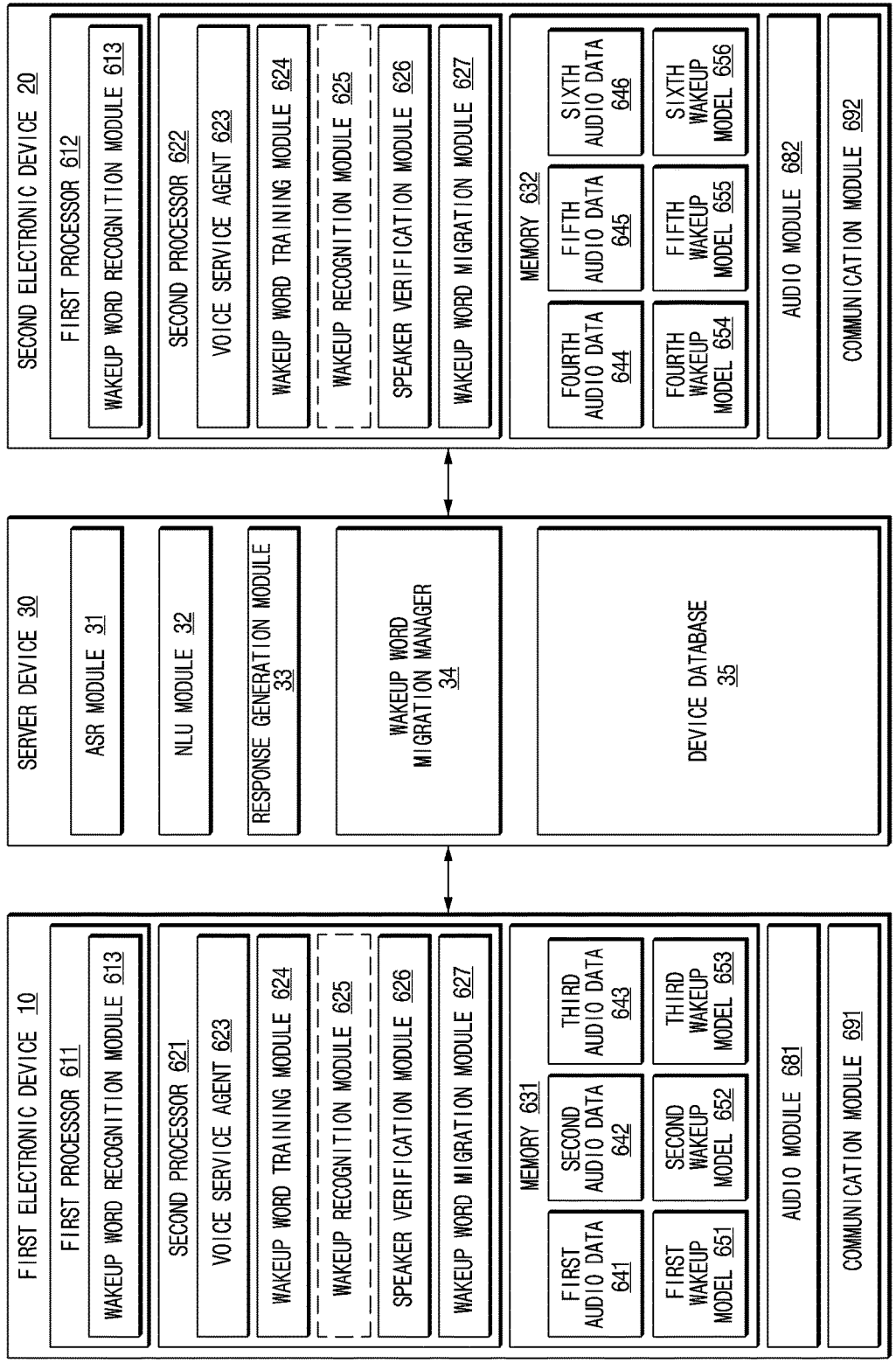
FIG. 6 illustrates configurations of a first electronic device, a second electronic device, and a server device according to an embodiment.

FIG. 6 illustrates configurations of the first electronic device 10, the second electronic device 20, and the server device 30 according to an embodiment.

According to an embodiment, the first electronic device 10 (e.g., the user terminal 100 of FIG. 1) may include at least one processor (e.g., a first processor 611 and/or a second processor 621) (e.g., the processor 160 of FIG. 1), a memory 631 (e.g., the memory 150 of FIG. 1), an audio module 681 (e.g., the speaker 130 and the microphone 120 of FIG. 1), and/or a communication module 691 of FIG. 1 (e.g., the communication interface 110 of FIG. 1). For example, the at least one processor may be operatively connected to the memory 631, the audio module 681, and the communication module 691, and may perform various operations of the first electronic device 10 depending on one or more instructions stored in the memory 631.

To save power, the first electronic device 10 can operate in a low power mode. That is, not all sounds received by the microphone 120 are user utterances, and not all user utterances are intended by the user to be a command. Accordingly, the first electronic device 10 can be configured to listen for a designated wakeup word from the user, which can be followed by an actual user command. When the first electronic device 10 detects the wake-up word, and the first electronic device 10 can leave the low power mode, and enter into a higher power mode, or a fully powered mode, where subsequent (within a predetermined time period) sounds received by microphone 120 are evaluated.

For example, the first electronic device 10 may include the first processor 611 and the second processor 621. For example, the first processor 611 may be a processor having the lower power consumption than the second processor 621. Even though the first electronic device 10 is in an idle state, the first processor 611 may be configured to perform a specified function while continuously receiving power, such as detecting the wakeup word. When the first electronic device 10 is in an idle state, the second processor 621 may receive the first power; when the first electronic device 10 is in an active state, the second processor 621 may receive second power higher than the first power. For example, the second processor 621 may be an application processor of the first electronic device 10. Hereinafter, the modules respectively described in association with processors may be a program, an application, a thread, and/or a software module, which is performed as the associated processor executes instructions in the memory 631.

According to an embodiment, the first processor 611 may implement a wakeup word recognition module 613. For example, the wakeup word recognition module 613 may be a speech recognition module that recognizes words having the specified number as a call word (or a wakeup word). For another example, the wakeup word recognition module 613 may verify a speaker together with speech recognition. In this case, the wakeup word recognition module 613 may operate together with a speaker verification module 626 to be described later. For example, it is illustrated in FIG. 6 that the wakeup word recognition module 613 is implemented by the first processor 611. However, the wakeup word recognition module 613 may be implemented by the second processor 621. In this case, the wakeup recognition module 625 may be used instead of the wakeup word recognition module 613, and may be omitted. For another example, the wakeup word recognition module 613 and the wakeup recognition module 625 may operate collaboratively. In this case, the wakeup word recognition module 613 and the wakeup recognition module 625 may operate simultaneously. According to an embodiment, the wakeup word recognition module 613 and the wakeup recognition module 625 may be modules having different features from each other. Hereinafter, the description of the wakeup word recognition module 613 may be identically applied to the wakeup recognition module 625.

According to an embodiment, the wakeup word recognition module 613 may determine whether a specified wakeup word has been received. For example, the wakeup word recognition module 613 may receive audio data, using an audio receiving circuit (e.g., a microphone) of the audio module 681, and may determine whether a specified wakeup word has been received, using the received audio data. For example, the wakeup word recognition module 613 may perform voice activation detection (VAD) on the received audio data, and then, may determine whether a specified wakeup word has been received, only when it is determined that there is a voice input.

According to an embodiment, the wakeup word recognition module 613 may determine whether a wakeup word is received, using a wakeup model. For example, the wakeup model includes information necessary to recognize a wakeup word, and may have a different form depending on a recognition algorithm used by the wakeup word recognition module 613. For example, when the wakeup word recognition module 613 performs an HMM-based speech recognition algorithm, the wakeup model may include a state initial probability, a state transition probability, and/or an observation probability, which is required for a Markov model. When the wakeup word recognition module 613 performs a neural network-based speech recognition algorithm, the wakeup model may include neural network model information. For example, the neural network model information may include layers, types and structures of nodes, a weight for each node, network connection information, and/or an activation function. According to an embodiment, the wakeup word recognition module 613 may use a hybrid model of HMM and neural network.

When the specified wakeup word is received, the wakeup word recognition module 613 may switch the state of the second processor 621 from an idle state to an active state. For example, the wakeup word recognition module 613 may deliver a signal (e.g., a triggering signal) for state transition of the second processor 621 to the second processor 621, and may switch the state of the second processor 621 from an idle state to an active state. The wakeup word recognition module 613 may switch the state of the second processor 621 to an active state, and may allow the second processor 621 to perform a specified function (e.g., a voice service agent 623). The state transition of the second processor 621 by the first processor 611 may be as described by Korean Patent Application No. 10-2014-0080541 or "Method for Executing Voice Recognition and Device Using the Same", Korean Patent Application, No. 10-2014-0063805, each of which are incorporated herein by reference for all purposes.

Unlike an ASR module 31 of the server device 30, the wakeup word recognition module 613 may perform speech recognition, using a voice algorithm having a simple form capable operating at low power. For example, the number of words capable of being recognized by the wakeup word recognition module 613 may be restricted. For another example, the wakeup word recognition module 613 may perform speech recognition on a specified voice (e.g., the voice of a specified user). In this case, the wakeup word recognition module 613 may be configured to use a wakeup model for a specified voice.

The configurations of the first processor 611 and the second processor 621 of FIG. 6 are exemplary, and the first processor 611 and the second processor 621 may be implemented with a single processor.

According to an embodiment, the second processor 621 may implement the voice service agent 623. The voice service agent 623 may receive a voice signal from a user, may process the voice signal to obtain or generate a response corresponding thereto, and may perform a function providing a response to a user. For example, the voice service agent 623 may generate text information corresponding to the voice signal by processing the voice signal, may extract a user's intent corresponding to a text from the text information, may plan an action corresponding to the extracted intent, and may provide a response according to the plan.

According to an embodiment, the voice service agent 623 may generate a response corresponding to the voice input through communication with the server device 30. For example, at least part of a series of operations of processing a voice signal and generating or obtaining a response may be performed by the server device 30. For example, at least part of an operation of converting a voice signal into a text may be performed by the ASR module 31 of the server device 30. For another example, at least part of a series of operations of processing a voice signal and generating or obtaining a response may be performed by the first electronic device 10 and/or the second electronic device 20. The first electronic device 10 and/or the second electronic device 20 may perform at least part of the functions of the ASR module 31 of the server device 30 and/or at least part of the functions of an NLU module 32 of the server device 30.

At least part of an operation of extracting information (e.g., a parameter and/or slot) associated with a user's intent from the text may be performed by the server device 30. At least part of an operation for planning the corresponding action (e.g., action sequence) based on the user's intent may be performed by a response generation module 33 of the server device 30.

According to an embodiment, the second processor 621 may implement a wakeup word training module 624. The wakeup word training module 624 may train and/or generate a wakeup model based on a voice from a user. For example, the wakeup word training module 624 may request an utterance from the user, and may train and/or generate a wakeup model based on a voice input received from the user. The wakeup word training module 624 may train and/or generate a wakeup model depending on the voice algorithm used by the wakeup word recognition module 613. For example, when the wakeup word recognition module 613 performs HMM-based speech recognition, the wakeup word training module 624 may train and/or generate a wakeup model from a voice input based on EM algorithm, MLLR algorithm, and/or MAP prediction. For another example, when the wakeup word recognition module 613 performs neural network-based speech recognition, the wakeup word training module 624 may train and/or generate a wakeup model, using a feedforward algorithm, a backward-propagation algorithm, or a linear transformation.

According to an embodiment, the second processor 621 may implement the speaker verification module 626. For example, the speaker verification module 626 may train and/or generate a wakeup model together with the wakeup word training module 624. In this case, the wakeup model may correspond to the "specified wakeup word" of the "specified speaker". The speaker verification module 626 may learn (e.g., generate) a wakeup model based on various algorithms. For example, the speaker verification module 626 may learn a wakeup model based on MLLR or MAP, using Gaussian mixture model-universal background model (GMM-UBM). For another example, the speaker verification module 626 may learn a wakeup model using an I-vector. For still another example, the speaker verification module 626 may learn the wakeup model based on a fusion method of GMM-UBM and I-vector. For yet another example, the speaker verification module 626 may generate a feature vector corresponding to a speaker based on a neural network.

According to an embodiment, the memory 631 may store at least a piece of audio data used to learn/generate the wakeup model. For example, the wakeup word training module 624 may obtain an audio signal corresponding to the first audio data 641, using the audio module 681 and may obtain first audio data 641 by removing noise from the obtained audio signal. For another example, the first audio data 641 may be obtained by the audio module 681.

According to an embodiment, the wakeup word training module 624 (or the wakeup word training module 624 and the speaker verification module 626) may generate a first wakeup model 651 from the first audio data 641. The wakeup word training module 624 may store the first wakeup model 651 in the memory 631. For example, the first wakeup model 651 may correspond to a specified wakeup word or may correspond to a specified wakeup word of a specified speaker. Similarly, the wakeup word training module 624 (or the wakeup word training module 624 and the speaker verification module 626) may generate a second wakeup model 652 from second audio data 642 and a third wakeup model 653 from third audio data 643.

According to an embodiment, the second processor 621 may implement a wakeup word migration module 627. The wakeup word migration module 627 may perform an operation associated with the migration of a wakeup word. When the user delivers the wakeup model used by the first electronic device 10 to the second electronic device 20 as it is, the second electronic device 20 may fail to verify the wakeup word, using the wakeup model due to the difference in audio features between the first electronic device 10 and the second electronic device 20. The audio feature of the audio module 681 of the first electronic device 10 may be different from the feature of the audio module 682 of the second electronic device 20. For example, the type of the first electronic device 10, the type of a microphone, and/or the location of the microphone may be different from the type of the second electronic device 20, the type of a microphone, and/or the location of the microphone. Accordingly, when using the wakeup model generated by the first electronic device 10 as it is, the second electronic device 20 may fail to recognize the wakeup word.

According to an embodiment, the wakeup word migration module 627 may perform processes for sharing the wakeup model with the second electronic device 20. For example, when a user input is received, the wakeup word migration module 627 may perform operations for sharing a wakeup model. For example, the wakeup word migration module 627 may transmit audio data (e.g., the first audio data 641) used to generate the wakeup model (e.g., the first wakeup model 651) requested to be shared, to the server device 30 through the communication module 691. The wakeup word migration module 627 of the first electronic device 10 may transmit audio data used to generate the wakeup model to the second electronic device 20 through the server device 30, and may transmit audio data used to generate a wakeup model to the second electronic device 20 without passing through the server device 30. For example, the wakeup word migration module 627 may convert the audio data (e.g., the first audio data 641) used to generate the wakeup model (e.g., the first wakeup model 651) requested to be shared, using the audio feature (e.g., the transfer function of the audio module 681) of the audio module 681 of the first electronic device 10. The wakeup word migration module 627 may convert the audio data (e.g., the first audio data 641) used to generate a wakeup model (e.g., the first wakeup model 651) requested to be shared, into audio data from which the hardware feature of the first electronic device 10 is removed. The wakeup word migration module 627 may transmit the converted audio data (e.g., audio data from which the hardware features is removed) to the server device 30 or the second electronic device 20. In this case, the first electronic device 10 may convert the audio data, using the audio feature of the audio module 681 or the audio feature stored in the memory 631, which is received from the server device 30. For another example, the wakeup word migration module 627 may transmit a wakeup model (e.g., the first wakeup model 651) requested to be shared, to the server device 30 or the second electronic device 20 through the communication module 691.

According to an embodiment, the wakeup word migration module 627 may perform processes for receiving the wakeup model from the second electronic device 20. For example, when a sharing request is received from the server device 30 or the second electronic device 20, the wakeup word migration module 627 may perform operations for sharing a wakeup model.

For example, the wakeup word migration module 627 may receive the audio data, which is recorded by the second electronic device 20 and converted based on the audio feature of the second electronic device 20, from the server device 30 or the second electronic device 20. For example, the wakeup word migration module 627 may receive the converted voice audio data by removing the audio feature of the second electronic device 20. The wakeup word migration module 627 may convert audio data received from the second electronic device 20, using the audio feature of the audio module 681 of the first electronic device 10. The wakeup word migration module 627 may convert the converted voice audio data (e.g., voice audio data from which the audio feature of the second electronic device 20 is removed) into audio data to which the audio feature of the audio module 681 of the first electronic device 10 is added. The wakeup word migration module 627 may deliver the converted audio data (e.g., audio data to which the audio feature of the audio module of the first electronic device 10 is added) to the wakeup word training module 624. The wakeup word training module 624 may train and/or generate a wakeup model, using the converted audio data.

For another example, the wakeup word migration module 627 may receive voice audio data recorded by the second electronic device 20, from the second electronic device 20 or the server device 30. In this case, the wakeup word migration module 627 may convert the audio data received from the server device 30 or the second electronic device 20, using the audio features of the audio module 681 of the first electronic device 10 and the audio module 682 of the second electronic device 20. For example, the wakeup word migration module 627 may remove the audio feature of the audio module 682 of the second electronic device 20 from the received audio data, and may generate the audio data converted by adding the audio feature of the audio module 681 of the first electronic device 10 to the audio data from which the audio feature of the audio module 682 of the second electronic device 20 is removed. The wakeup word migration module 627 may deliver the converted audio data to the wakeup word training module 624. The wakeup word training module 624 may train and/or generate a wakeup model, using the converted audio data.

For another example, the wakeup word migration module 627 may receive voice audio data, which is recorded by the second electronic device 20 and converted by the server device 30 and/or the second electronic device 20 based on the audio features of the audio module 681 and the audio module 682, from the server device 30. The wakeup word migration module 627 may deliver the converted audio data to the wakeup word training module 624. The wakeup word training module 624 may train and/or generate a wakeup model, using the converted audio data. For example, the wakeup word migration module 627 of the second electronic device 20 may remove the audio feature of the audio module 682 of the second electronic device 20 from the audio data, and may transmit audio data, from which the audio feature of the audio module 682 is removed, to the server device 30. The server device 30 may generate the audio data converted by adding the feature of the audio module 681 of the first electronic device 10 to audio data from which the audio feature of the audio module 682 is removed, and may transmit the converted audio data to the first electronic device 10. For example, the wakeup word migration module 627 of the second electronic device 20 may remove the audio feature of the audio module 682 of the second electronic device 20 from the audio data, may generate the audio data converted by adding the feature of the audio module 681 of the first electronic device 10 to the audio data from which the audio feature of the audio module 682 is removed, and may transmit the converted audio data to the first electronic device 10, through the server device 30 or directly. For example, the wakeup word migration module 627 of the second electronic device 20 may transmit audio data to the server device 30. The server device 30 may remove the audio feature of the audio module 682 of the second electronic device 20 from the audio data, may generate the audio data converted by adding a feature of the audio module 681 of the first electronic device 10 to audio data from which the audio feature of the audio module 682 is removed, and may transmit the converted audio data to the first electronic device 10.

According to an embodiment, the second electronic device 20 (e.g., the user terminal 100 of FIG. 1) may include at least one processor (e.g., a first processor 612 and/or a second processor 622) (e.g., the processor 160 of FIG. 1), a memory 632 (e.g., the memory 150 of FIG. 1), an audio module 682 (e.g., the speaker 130 and the microphone 120 of FIG. 1), and/or a communication module 692 of FIG. 1 (e.g., the communication interface 110 of FIG. 1). For example, the at least one processor may be operatively connected to the memory 632, the audio module 682, and the communication module 692, and may perform operations of the second electronic device 20 depending on one or more instructions stored in the memory 632. The description of the second electronic device 20 may be referenced by the description of the first electronic device 10 of FIG. 1. Unless otherwise described, the description of the first processor 612 may be referenced by the description of the first processor 611; the description of the second processor 622 may be referenced by the description of the second processor 621; the description of the memory 632 may be referenced by the description of the memory 631; and, the description of the audio module 682 may be referenced by the description of the audio module 681.

According to certain embodiments, the server device 30 (e.g., the intelligence server 200 of FIG. 1) may include an ASR module 31, an NLU module 32, a response generation module 33, a wakeup word migration manager 34, and/or a device database 35.

According to an embodiment, the ASR module 31 (e.g., the ASR module 221 in FIG. 1) may convert a voice signal, which is received from a user terminal (e.g., the first electronic device 10 and/or the second electronic device 20), into a text. The ASR module 31 may use a speech recognition engine capable of performing large vocabulary speech recognition. For example, the ASR module 31 may recognize words capable of being combined by recognizing phoneme units. For example, the ASR module 31 may perform speech recognition, using an algorithm such as a hidden Markov model (HMM), a weighted finite-state transducer (wFST), and/or neural network. For example, the ASR module 31 may recognize words more than the wakeup word recognition module 613.

According to an embodiment, the NLU module 32 (e.g., the NLU module 223 in FIG. 1) may determine the intent corresponding to an utterance, and the parameters (slots) necessary to perform the intent, by analyzing the text converted through the ASR module 31.

According to an embodiment, the response generation module 33 (e.g., the planner module 225 and/or the NLG module 227 in FIG. 1) may generate information or content to be provided to the user, based on the intent and parameters determined through the NLU module 32. For example, the content may include visual and auditory information. The response generated by the response generation module 33 may also include information to be provided as voice to the user. At this time, the text corresponding to the information to be uttered may be generated based on the specified template, or may be generated using an NLG module (e.g., the NLG module 227 in FIG. 1) having a more complex form. When generating the text, the response generation module 33 may use wakeup word information recognized by the user terminal. For example, the wakeup word information may be received by the server device 30, during or after the generation of the wakeup model of the wakeup word training module 624. The server device 30 may store the received wakeup model in a device database 35 together with information of the device transmitting the wakeup model.

According to an embodiment, a wakeup word migration manager 34 may perform operations for sharing a wakeup model between different user terminals (e.g., the user terminal 100 of FIG. 1). The wakeup word migration manager 34 may minimize the deterioration in the performance of the wakeup model due to differences in audio features between different user terminals. For example, the first wakeup model 651 of the first electronic device 10 may be shared with the second electronic device 20.

According to an embodiment, the wakeup word migration manager 34 may receive the first audio data 641 used to generate the first wakeup model 651, from the first electronic device 10. The wakeup word migration manager 34 may convert the first audio data 641, using the audio feature of the first electronic device 10. For example, the wakeup word migration manager 34 may remove the audio feature of the first electronic device 10 from the first audio data 641, using the audio feature (e.g., the transfer function of an input device (e.g., an audio receiving circuit (e.g., a microphone)) of the audio module 681) of the first electronic device 10. According to an embodiment, the wakeup word migration manager 34 may convert the first audio data 641 by de-convolving the audio feature (e.g., a transfer function) of the first electronic device 10 with the first audio data 641. After converting the first audio data 641, the wakeup word migration manager 34 may add the audio feature of the second electronic device 20, using the audio feature (e.g., the transfer function of an input device of the audio module 682) of the second electronic device 20. The wakeup word migration manager 34 may generate fourth audio data 644 by convolving the converted first audio data 641 (e.g., the audio feature of the first electronic device 10 is removed) with the audio feature (e.g., a transfer function) of the second electronic device 20. The wakeup word migration manager 34 may deliver the fourth audio data 644 to the second electronic device 20. According to an embodiment, the wakeup word migration module 627 of the second electronic device 20 may generate a fourth wakeup model 654 from fourth audio data 644, using the wakeup word training module 624.

According to an embodiment, the wakeup word migration manager 34 may receive audio data converted from the first audio data 641 used to generate the first wakeup model 651, from the first electronic device 10. For example, the first electronic device 10 may remove the audio feature of the first electronic device 10 from the first audio data 641, and then may transmit the converted audio data to the server device 30. According to an embodiment, the wakeup word migration manager 34 may add the audio feature of the second electronic device 20, using the audio feature (e.g., the transfer function of an input device of the audio module 682) of the second electronic device 20. The wakeup word migration manager 34 may generate the fourth audio data 644 by convolving the converted first audio data 641 with the audio feature (e.g., a transfer function) of the second electronic device 20. The wakeup word migration manager 34 may deliver the fourth audio data 644 to the second electronic device 20. The wakeup word migration module 627 of the second electronic device 20 may generate the fourth wakeup model 654 from the fourth audio data 644, using the wakeup word training module 624.

According to an embodiment, the wakeup word migration manager 34 may receive audio data converted from the first audio data 641 used to generate the first wakeup model 651, from the first electronic device 10. For example, the first electronic device 10 may remove the audio feature of the first electronic device 10 from the first audio data 641, and then may transmit the converted audio data to the server device 30. The wakeup word migration manager 34 may transmit the converted audio data to the second electronic device 20. For example, the wakeup word migration manager 34 may transmit the converted audio data (e.g., audio data obtained as the feature of the audio module 681 is removed from the first audio data 641) to the second electronic device 20 together with information about the audio feature of the second electronic device 20. The wakeup word migration module 627 of the second electronic device 20 may add the audio feature (e.g., the transfer function of an input device (e.g., an audio input circuit (e.g., a microphone)) of the audio module 682) of the second electronic device 20 to audio data received using the audio feature. For example, the wakeup word migration module 627 of the second electronic device 20 may generate the fourth audio data 644 from the received audio data, using the audio feature of the second electronic device 20. The wakeup word migration module 627 of the second electronic device 20 may generate the fourth wakeup model 654 from the fourth audio data 644, using the wakeup word training module 624.

According to an embodiment, the wakeup word migration manager 34 may receive the first wakeup model 651 from the first electronic device 10. The wakeup word migration manager 34 may generate the fourth wakeup model 654 from the first wakeup model 651, using the audio feature of the first electronic device 10 and the audio feature of the second electronic device 20. For example, the wakeup word migration manager 34 may transmit the fourth wakeup model 654 to the second electronic device 20, through the server device 30 or directly.

According to certain embodiments, the device database 35 may store audio features associated with a plurality of electronic devices. For example, the audio feature may include an audio feature of the first electronic device 10 and an audio feature of the second electronic device 20. According to an embodiment, audio features of a plurality of electronic devices may be preset values. For example, the audio feature may be a value specified by the manufacturer of the corresponding electronic device. According to an embodiment, audio features of a plurality of electronic devices may be values generated by the server device 30. For example, the server device 30 may obtain an audio feature of the corresponding user terminal from voice data received from other user terminals (electronic devices). According to an embodiment, the server device 30 may generate audio features depending on neural network learning. According to an embodiment, the server device 30 may store the generated audio feature in the device database 35 together with the information of the corresponding user terminal.

Figure 7:
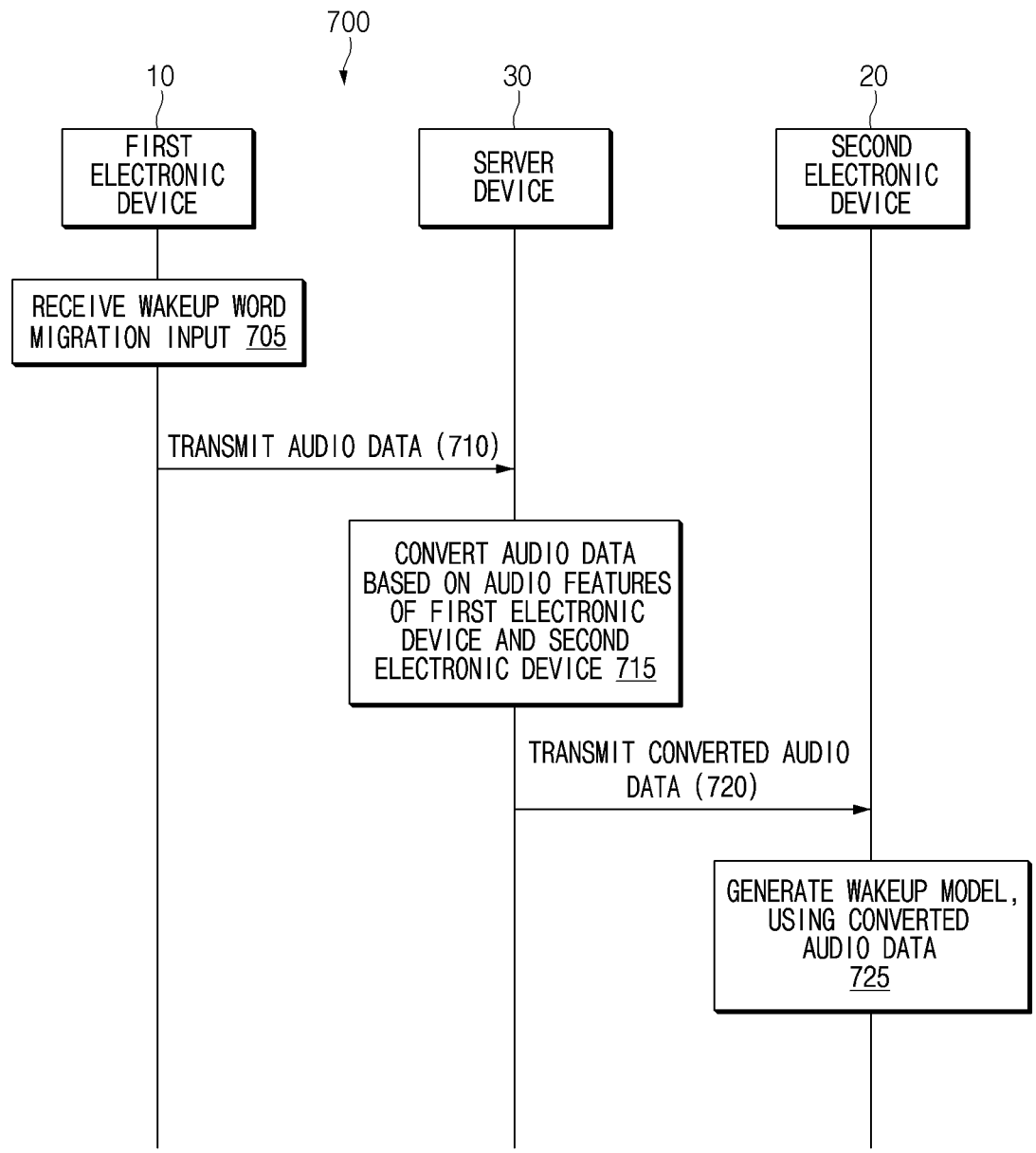
FIG. 7 is a signal flowchart for generating a wakeup model according to an embodiment.

FIG. 7 is a signal flowchart 700 for generating a wakeup model according to an embodiment.

In operation 705, the first electronic device 10 (e.g., the user terminal 100 of FIG. 1) may receive a wakeup word migration input. For example, the first electronic device 10 may provide a user interface for receiving the wakeup word migration input through a display, and may receive an input to the user interface as the wakeup word migration input. For example, the first electronic device 10 may provide the user interface described later with reference to FIG. 8.

Figure 8:
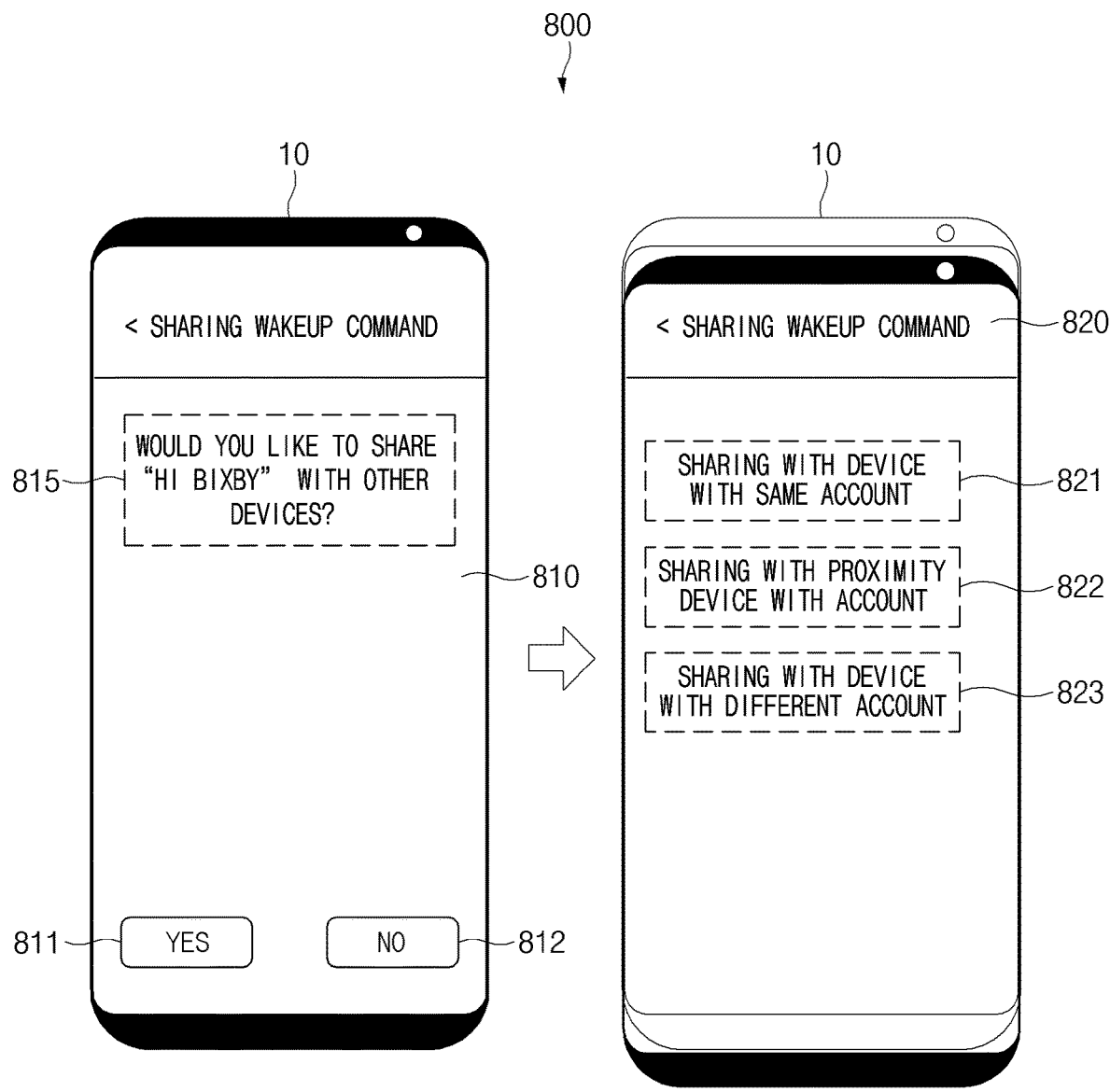
FIG. 8 illustrates a user interface for sharing a wakeup model according to an embodiment.

FIG. 8 illustrates a user interface 800 for sharing a wakeup model according to an embodiment.

According to an embodiment, the first electronic device 10 (e.g., the user terminal 100 of FIG. 1) may provide a first screen 810. For example, the first screen 810 may include guide information 815 for inquiring whether to share a wakeup word (e.g., Hi Bixby). The first screen 810 may include a YES button 811 indicating that the sharing is approved, and a NO button 812 indicating that the sharing is not approved. For example, when an input to the YES button 811 of the first screen 810 is received, the first electronic device 10 may perform operation 710 of FIG. 7.

Another example, when an input to the YES button 811 of the first screen 810 is received, the first electronic device 10 may provide a second screen 820 for selecting an electronic device with which a wakeup word is to be shared. For example, the second screen 820 may provide selection options for various types of electronic devices.

When the selection to a first option 821 is received, the first electronic device 10 may share a wakeup word with an electronic device (e.g., the second electronic device 20) belonging to the same account as the first electronic device 10. For example, the first electronic device 10 may obtain information about at least one electronic device belonging to the same account as the first electronic device 10 from the server device 30, and may provide information about the obtained at least one electronic device through a display. The first electronic device 10 may share a wakeup word with an electronic device corresponding to a user input to one of the provided at least one electronic device.

When a selection to a second option 822 is received, the first electronic device 10 may share a wakeup word with an electronic device (e.g., the second electronic device 20) located to be adjacent to the first electronic device 10. For example, the first electronic device 10 may verify at least one electronic device located to be adjacent to the first electronic device 10 based on a short-range communication protocol, using the communication module 691. The first electronic device 10 may provide a list including information about at least one adjacent electronic device, and may share a wakeup word with an electronic device corresponding to a user input to one of at least one adjacent electronic device in the provided list.

When a selection to the third option 823 is received, the first electronic device 10 may share a wakeup word with an electronic device belonging to an account different from the first account associated with the first electronic device 10. For example, when an input to the third option 823 is received, the first electronic device 10 may provide a user interface for receiving information about another account to be shared. The first electronic device 10 may receive information about the second account through a user interface, and may provide a list of electronic devices associated with the second account on the display. For example, the first electronic device 10 may obtain a list of electronic devices associated with the second account from the server device 30. The first electronic device 10 may share a wakeup word with an electronic device corresponding to a user input to one of the electronic devices in the list.

Returning to FIG. 7, in operation 710, the first electronic device 10 may transmit audio data to the server device 30. For example, the audio data may be audio data (for example, the exemplars of the user uttering the wakeup word) used to generate a wakeup model of a wakeup word to be shared. For example, the wakeup word migration module 627 described above with reference to FIG. 6 may transmit the audio data.

In operation 715, the server device 30 may convert the audio data based on the audio features of the first electronic device 10 and the second electronic device 20. That is, the audio data includes characteristics of the microphone of the first electronic device 10 which may be different from characteristics of the microphone of the second electronic device 10. The server device 30 may remove the audio feature of the first electronic device 10 from the audio data and may add the audio feature of the second electronic device 20 to the audio data. For example, the server device 30 may convert the audio data using the wakeup word migration manager 34 described above with reference to FIG. 6. For example, the server device 30 may convert the audio data depending on a method described later with reference to FIG. 9.

Figure 9:
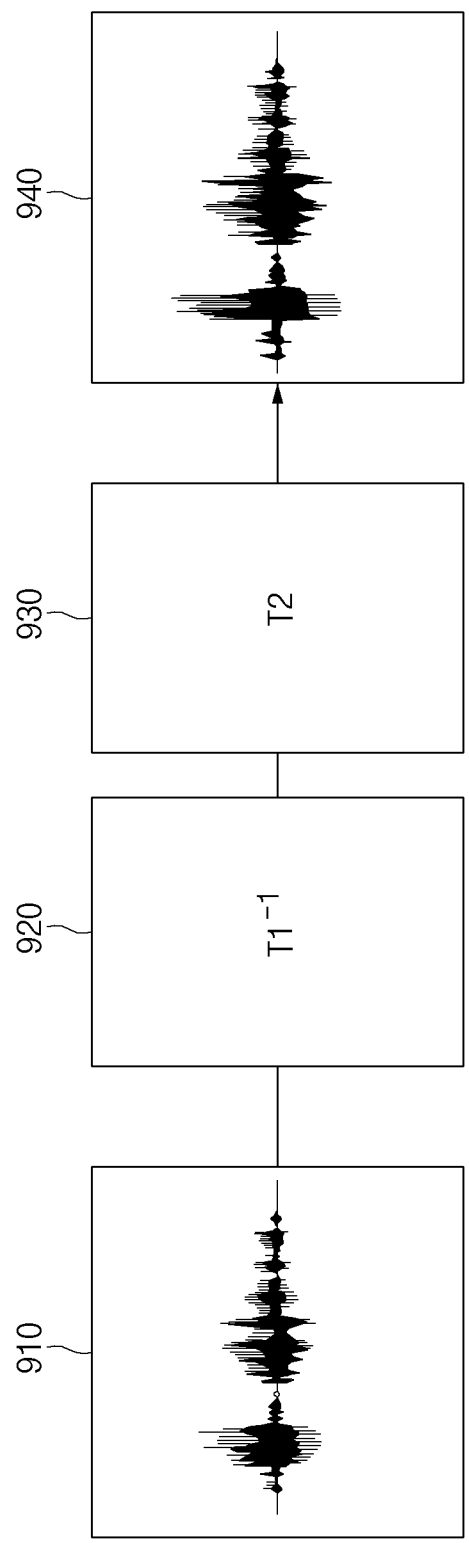
FIG. 9 illustrates audio data conversion according to an embodiment.

FIG. 9 illustrates audio data conversion according to an embodiment. The inverse of the transfer function (T1$^{-1}$) 920 of the first electronic device 10 and a transfer function (T2) 930 of the second electronic device 20 can be applied to the audio data 910, thereby resulting in audio data 920. The second audio data 920 is likely to represent a voice signal that would result if the user was to utter the wakeup word at the second electronic device 920.

According to an embodiment, the server device 30 may convert audio data for sharing a wakeup model. For example, the server device 30 may receive first audio data 910 corresponding to the wakeup model from the first electronic device 10. The server device 30 may remove the audio feature of the first electronic device 10 from the first audio data 910, and then may generate second audio data 940 by adding the audio feature of the second electronic device 20 with which the wakeup word is to be shared. For example, the server device 30 may remove the audio feature of the first electronic device 10 from the first audio data 910 by de-convolving the transfer function (e.g., the first transfer function) of the audio receiving device (e.g., the input device of the audio module 681 of FIG. 6) of the first electronic device 10. For example, the server device 30 may add the audio feature of the second electronic device 20 to the first audio data 910 from which the audio feature of the first electronic device 10 is removed, by convolving the transfer function (e.g., the second transfer function) of the audio receiving device (e.g., the input device of the audio module 682 of FIG. 6) of the second electronic device 20. In a frequency domain, the server device 30 may convert the first audio data 910 to second audio data 940 according to Equation 1 below.

$$S2(f) = T2 \cdot T1^{-1} S1(f) \quad \text{[Equation 1]}$$

In the above equation, S1($f$) denotes the first audio data 910; S2($f$) denotes the second audio data 940; TF$^{-1}$ 920 denotes the inverse function of the transfer function of the audio receiving device of the first electronic device 10; T2 930 denotes the transfer function of the audio receiving device of the second electronic device 20.

In certain embodiments, the foregoing can be performed by the second electronic device 20.

Returning to FIG. 7, in operation 720, the server device 30 may transmit the converted audio data (e.g., the second audio data 940 of FIG. 9) to the second electronic device 20.

In operation 725, the second electronic device 20 may generate a wakeup model, using the converted audio data. For example, the second electronic device 20 may generate a wakeup model from audio data using the wakeup word training module 624 of FIG. 6.

The sharing method illustrated in FIG. 7 is by way of example, and embodiments of the disclosure are not limited thereto. For example, as described above with reference to FIG. 6, at least part of operation 715 may be performed by the first electronic device 10 and/or the second electronic device 20.

Figure 10:
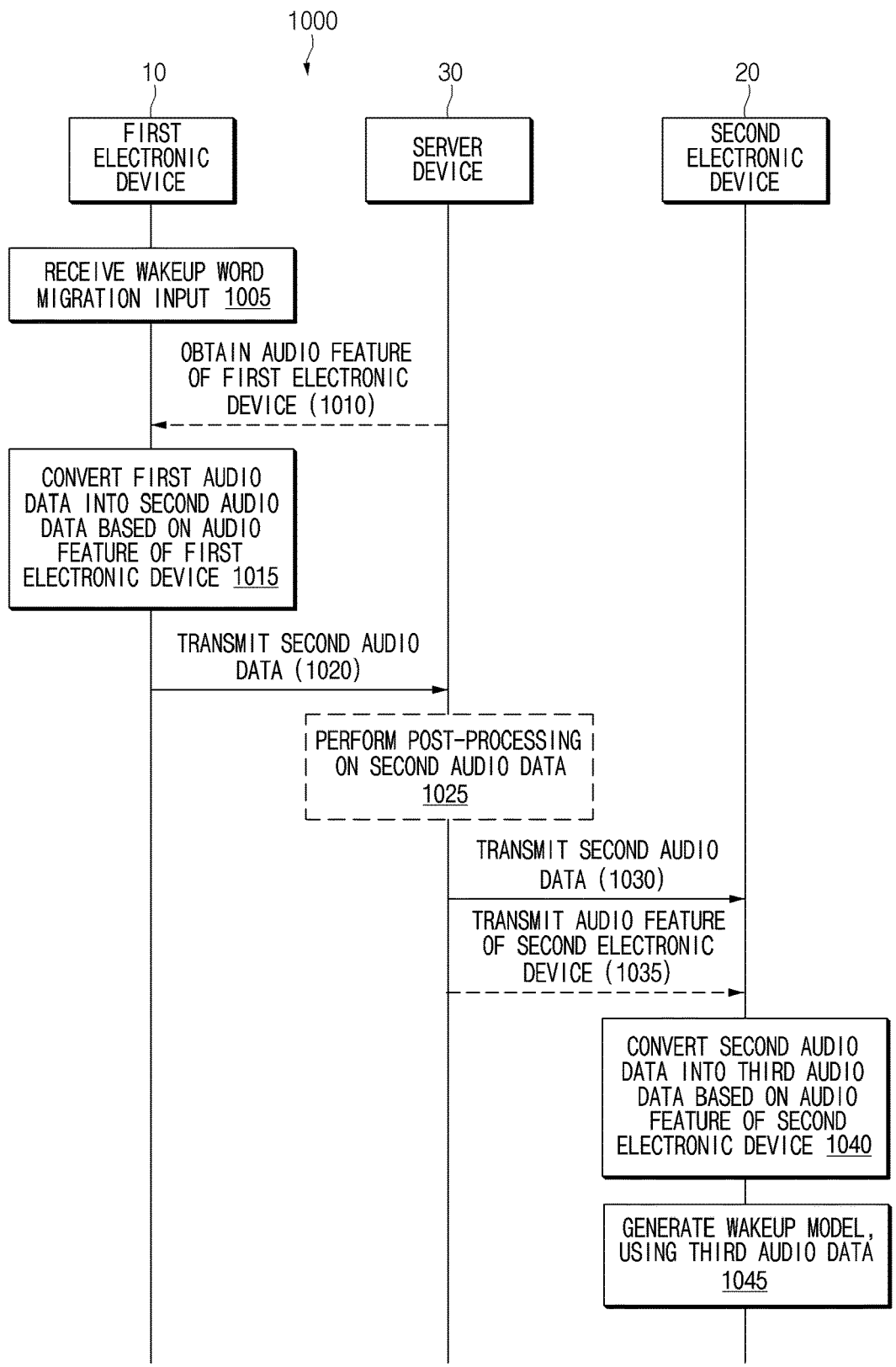
FIG. 10 is a signal flowchart for generating a wakeup model according to an embodiment.

FIG. 10 is a signal flowchart 1000 for generating a wakeup model according to an embodiment. In this embodiment, the first electronic device 10 performs the inverse transformation of the transfer function (T1$^{-1}$) of the microphone at the first electronic device 10. The second electronic device 20 applies the transfer function (T2) of the microphone at the second electronic device 20.

In operation 1005, the first electronic device 10 may receive a wakeup word migration input. The description of operation 1005 may be referenced by the description associated with FIG. 8 and operation 705 of FIG. 7.

In operation 1010, the first electronic device 10 may obtain an audio feature (e.g., the transfer function of the audio receiving device of the first electronic device 10, or the inverse function thereof) of the first electronic device 10 from the server device 30. For example, operation 1010 may be omitted. The first electronic device 10 may obtain the audio feature of the first electronic device 10 from the memory 631 of the first electronic device 10. For another example, the first electronic device 10 may obtain the audio feature of the first electronic device 10 at any time point.

In operation 1015, the first electronic device 10 may convert first audio data into second audio data based on the audio feature of the first electronic device. The first electronic device 10 may generate the second audio data by removing the audio feature of the first electronic device 10 from the first audio data. For example, the first electronic device 10 may generate the second audio data by de-convolving the first audio data and a transfer function of the audio receiving device of the first electronic device 10.

In operation 1020, the first electronic device 10 may transmit the second audio data to the server device 30. In operation 1025, the server device 30 may perform post-processing on the second audio data. For example, the server device 30 may perform noise removal, noise suppression, and/or amplitude adjustment on the second audio data. According to an embodiment, operation 1025 may be omitted.

In operation 1030, the server device 30 may transmit the second audio data to the second electronic device 20. The second audio data is based on a user utterance recorded at the first electronic device 10. For example, the server device 30 may transmit the second audio data to the second electronic device 20 from which sharing is requested by the first electronic device 10. In operation 1035, the server device 30 may transmit the audio feature (e.g., the audio feature of the audio receiving device of the second electronic device 20) of the second electronic device 20 to the second electronic device 20. For example, the server device 30 may transmit an audio feature to the second electronic device 20 together with the second audio data. For example, operation 1035 may be omitted. The second electronic device 20 may obtain the audio feature of the second electronic device 20 from the memory 632 of the second electronic device 20. For another example, the server device 30 may transmit the audio feature of the second electronic device 20 to the second electronic device 20 at any time point.

In operation 1040, the second electronic device 20 may convert the second audio data into third audio data based on the audio feature of the second electronic device. For example, the second electronic device 20 may generate the third audio data from the second audio data by convolving the second audio data and a transfer function of the audio receiving device of the second electronic device 20.

In operation 1045, the second electronic device 20 may generate a wakeup model, using the third audio data.

Figure 11:
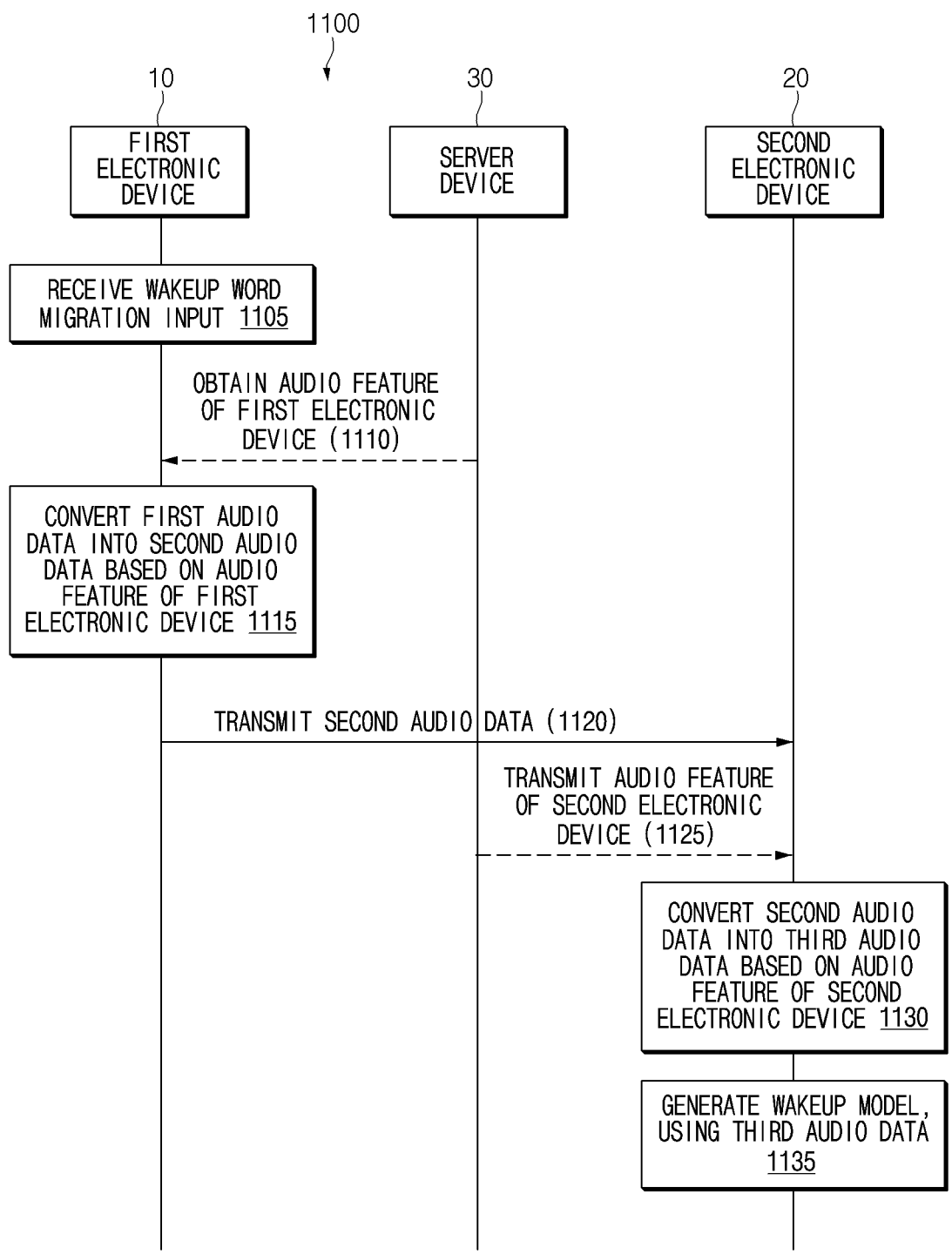
FIG. 11 is a signal flowchart for generating a wakeup model according to an embodiment.

FIG. 11 is a signal flowchart 1100 for generating a wakeup model according to an embodiment.

In operation 1105, the first electronic device 10 may receive a wakeup word migration input. The description of operation 1105 may be referenced by the description associated with FIG. 8 and operation 705 of FIG. 7.

In operation 1110, the first electronic device 10 may obtain an audio feature (e.g., the transfer function of the audio receiving device of the first electronic device 10, or the inverse function thereof) of the first electronic device 10 from the server device 30. For example, operation 1110 may be omitted. The first electronic device 10 may obtain the audio feature of the first electronic device 10 from the memory 631 of the first electronic device 10. For another example, the first electronic device 10 may obtain the audio feature of the first electronic device 10 at any time point.

In operation 1115, the first electronic device 10 may convert first audio data into second audio data based on the audio feature of the first electronic device. The first electronic device 10 may generate the second audio data by removing the audio feature of the first electronic device 10 from the first audio data. For example, the first electronic device 10 may generate the second audio data by de-convolving the first audio data and a transfer function of the audio receiving device of the first electronic device 10.

In operation 1120, the first electronic device 10 may transmit the second audio data to the second electronic device 20.

In operation 1125, the second electronic device 20 may receive the audio feature (e.g., the audio feature of the audio receiving device of the second electronic device 20) of the second electronic device 20 from the server device 30. For example, operation 1125 may be omitted. The second electronic device 20 may obtain the audio feature of the second electronic device 20 from the memory 632 of the second electronic device 20. For another example, the second electronic device 20 may receive the audio feature of the first electronic device 20 from the server device 30 at any time point.

In operation 1130, the second electronic device 20 may convert the second audio data into third audio data based on the audio feature of the second electronic device. For example, the second electronic device 20 may generate the third audio data from the second audio data by convolving the second audio data and a transfer function of the audio receiving device of the second electronic device 20. The second electronic device 20 may generate the third audio data by adding the audio feature of the second electronic device to the second audio data.

In operation 1135, the second electronic device 20 may generate a wakeup model, using the third audio data.

Figure 12:
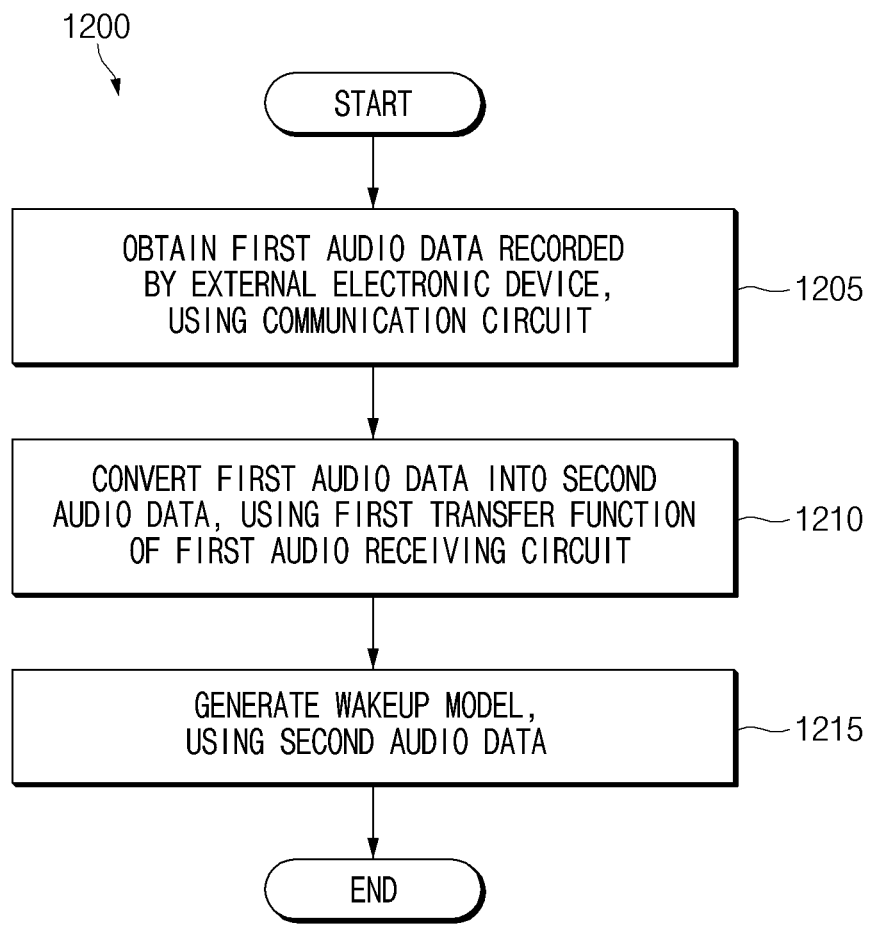
FIG. 12 is a flowchart of a method for generating a wakeup model according to an embodiment.

FIG. 12 is a flowchart 1200 of a method for generating a wakeup model according to an embodiment.

According to an embodiment, an electronic device (e.g., the user terminal 100 of FIG. 1 or the second electronic device 20 of FIG. 6) may include a first audio receiving circuit (e.g., a receiving circuit (e.g., a microphone) of the audio module 682 of FIG. 6), a communication circuit (e.g., the communication module 692 of FIG. 6), at least one processor (e.g., the first processor 612 and/or the second processor 622 of FIG. 6) operatively connected to the audio receiving circuit and the communication circuit, and a memory (e.g., the memory 632 of FIG. 6). For example, the memory may store one or more instructions that, when executed, cause at least one processor to perform operations to be described later. The one or more instructions may be stored on non-transitory computer-readable media.

In operation 1205, the at least one processor may obtain first audio data that is based on a user utterance recorded by an external electronic device (e.g., the first electronic device 10 in FIG. 6). For example, an electronic device and an external electronic device may be electronic devices associated with the same user account. The at least one processor may obtain the first audio data, using a communication circuit. For example, after the first audio data can be the recorded user utterance by the external electronic device, with the audio feature of the external electronic device be removed by application of an inverse of second transfer function of a second audio receiving circuit of the external electronic device. For example, the description of operation 1205 may be referenced by the description associated with operation 1030 of FIG. 10 or operation 1120 of FIG. 11.

In operation 1210, the at least one processor may convert the first audio data into second audio data, using a first transfer function of the first audio receiving circuit. For example, the at least one processor may generate the second audio data by adding an audio feature of the first audio receiving circuit to the first audio data using the first transfer function. For another example, the at least one processor may convert the first audio data into third audio data, using a second transfer function of the second audio receiving circuit of the external electronic device, and may convert the third audio data into the second audio data, using the first transfer function. For example, the description of operation 1210 may be referenced by the description associated with operation 1040 of FIG. 10 or operation 1130 of FIG. 11.

In operation 1215, the at least one processor may generate a wakeup model, using the second audio data. For example, the wakeup model may be to verify the wakeup word associated with the first audio data. The at least one processor may generate the wakeup model based on at least one of an expectation-maximization (EM) algorithm, a maximum likelihood linear regression (MLLR) algorithm, a feedforward algorithm, a backward-propagation algorithm, or a linear transformation algorithm, using the second audio data. For example, the description of operation 1215 may be referenced by the description associated with operation 1045 of FIG. 10 or operation 1135 of FIG. 11.

According to an embodiment, the at least one processor may receive a voice signal, using the audio receiving circuit, and may determine whether the voice signal corresponds to a voice of a speaker associated with the wakeup model and includes a specified wakeup word, using the wakeup model. For example, the at least one processor may verify the speaker of the corresponding voice, using the wakeup model. When the voice signal corresponds to the voice of the speaker of the wakeup model and includes the specified wakeup word, the at least one processor may execute a specified application (e.g., an intelligence app for processing a voice input).

According to an embodiment, the at least one processor may receive at least one of a first transfer function or a second transfer function from a server device, using a communication circuit.

Figure 13:
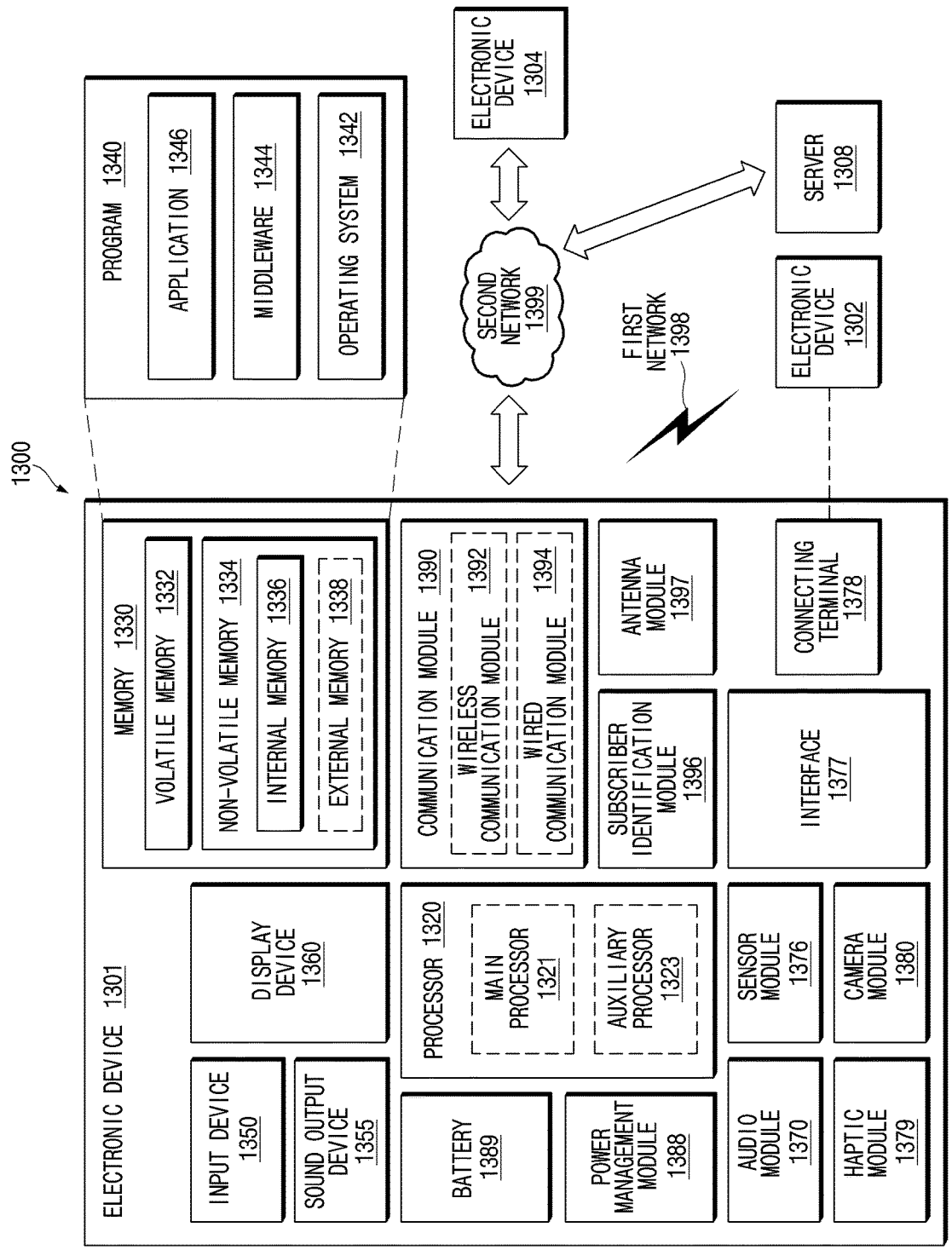
FIG. 13 illustrates a block diagram of an electronic device according to certain embodiments.

FIG. 13 is a block diagram illustrating an electronic device 1301 in a network environment 1300 according to certain embodiments. Referring to FIG. 13, the electronic device 1301 in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301. In some embodiments, some of the components may be implemented as single integrated circuitry. For example, the sensor module 1376 (e.g., a fingerprint sensor, an iris sensor, or an illuminance sensor) may be implemented as embedded in the display device 1360 (e.g., a display).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by other component (e.g., the processor 1320) of the electronic device 1301, from the outside (e.g., a user) of the electronic device 1301. The input device 1350 may include, for example, a microphone, a mouse, a keyboard, or a digital pen (e.g., a stylus pen).

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., PCB). According to an embodiment, the antenna module 1397 may include a plurality of antennas. In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in this specification, a wakeup model may be generated based on audio features.

According to certain embodiments disclosed in this specification, a seamless voice agent environment may be provided by generating an audio feature-based wakeup model.

Besides, a variety of effects directly or indirectly understood through the disclosure may be provided.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
a microphone;
a communication circuit;
at least one processor operatively connected to the microphone and the communication circuit; and
a memory operatively connected to the at least one processor,
wherein the memory stores one or more instructions that, when executed, cause the at least one processor to:
obtain first audio data at the electronic device through the communication circuit, wherein the first audio data is based on a user utterance recorded by an external electronic device and the user utterance includes a wakeup word used for generating a previous wakeup model by the external electronic device, the previous wakeup model used to verify the wakeup word at the external electronic device;
convert the first audio data into second audio data, using a first transfer function of the microphone of the electronic device, wherein the second audio data estimates a voice signal that would be detected by the microphone of the electronic device if the user utterance including the wakeup word that was recorded at the external electronic device was uttered at the electronic device; and
generate a wakeup model at the electronic device, using the second audio data, the wakeup model configured to verify the wakeup word.

2. The electronic device of claim 1, wherein the first audio data comprises the user utterance recorded by the external electronic device with application of an inverse of a second transfer function of a microphone of the external electronic device.

3. The electronic device of claim 2, wherein the one or more instructions that, when executed, cause the at least one processor to:
generate the second audio data by adding an audio feature of the microphone of the electronic device to the first audio data using the first transfer function.

4. The electronic device of claim 1, wherein convert the first audio data into the second audio data comprises:
convert the first audio data into third audio data, using a second transfer function of a microphone of the external electronic device; and
convert the third audio data into the second audio data, using the first transfer function.

5. The electronic device of claim 1, wherein the one or more instructions that, when executed, cause the at least one processor to:
receive at least one of the first transfer function or a second transfer function from a server device, using the communication circuit.

6. The electronic device of claim 1, wherein the electronic device and the external electronic device are associated with the same user account.

7. The electronic device of claim 1, wherein the one or more instructions that, when executed, cause the at least one processor to:
generate the wakeup model based on at least one of an expectation-maximization (EM) algorithm, a maximum likelihood linear regression (MLLR) algorithm, a feedforward algorithm, a backward-propagation algorithm, or a linear transformation algorithm, using the second audio data.

8. The electronic device of claim 1, wherein the one or more instructions that, when executed, cause the at least one processor to:
receive a voice signal, using the microphone of the electronic device; and
determine whether the voice signal corresponds to a voice of a speaker associated with the first audio data and includes the wakeup word, using the wakeup model.

9. A method for generating a wakeup model of an electronic device, the method comprising:
obtaining first audio data at the electronic device based on a user utterance recorded by an external electronic device, wherein the first audio data is based on the user utterance recorded by the external electronic device and the user utterance includes a wakeup word used for generating a previous wakeup model by the external electronic device, the previous wakeup model used to verify the wakeup word at the external electronic device;
converting the first audio data into second audio data by the electronic device, using a first transfer function of a microphone of the electronic device, wherein the second audio data estimates a voice that would be detected by the microphone of the electronic device if the user utterance including the wakeup word that was recorded at the external electronic device was uttered at the electronic device; and
generating the wakeup model using the second audio data by the electronic device, the wakeup model configured to verify the wakeup word.

10. The method of claim 9, wherein the first audio data comprises the user utterance recorded by the external electronic device with application of an inverse of a second transfer function of a microphone of the external electronic device.

11. The method of claim 10, wherein converting of the first audio data into the second audio data using the first transfer function includes:
generating the second audio data by adding an audio feature of the microphone of the electronic device to the first audio data using the first transfer function.

12. The method of claim 9, wherein converting of the first audio data into the second audio data using the first transfer function includes:
converting the first audio data into third audio data, using a second transfer function of a microphone of the external electronic device; and
converting the third audio data into the second audio data, using the first transfer function.

13. The method of claim 9, further comprising:
receiving at least one of the first transfer function or a second transfer function from a server device.

14. The method of claim 9, wherein the electronic device and the external electronic device are associated with the same user account.

15. The method of claim 9, further comprising:
receiving a voice signal; and
determining whether the voice signal corresponds to a voice of a speaker associated with the first audio data and includes the wakeup word, using the wakeup model.

16. A non-transitory computer-readable media storing one or more instructions, wherein the one or more instructions that, when executed, cause at least one processor of an electronic device to:
- obtain first audio data at an electronic device based on a user utterance recorded by an external electronic device, wherein the first audio data is based on the user utterance recorded by the external electronic device and the user utterance includes a wakeup word used for generating a previous wakeup model by the external electronic device, the previous wakeup model used to verify the wakeup word at the external electronic device;
- convert the first audio data to second audio data, using a first transfer function of a microphone of the electronic device, wherein the second audio data estimates a voice signal that would be detected by the microphone of the electronic device if the user utterance including the wakeup word that was recorded at the external electronic device was uttered at the electronic device; and
- generate a wakeup model at the electronic device using the second audio data, the wakeup model configured to verify the wakeup word.

17. The non-transitory computer-readable media of claim 16, wherein the first audio data comprises the user utterance recorded by the external electronic device with application of an inverse of a second transfer function of a microphone of the external electronic device.

18. The non-transitory computer-readable media of claim 16, wherein the one or more instructions that, when executed, cause the at least one processor to:
- generate the second audio data by removing an audio feature of the microphone of the electronic device to the first audio data by using the first transfer function.

19. The non-transitory computer-readable media of claim 16, wherein convert the first audio data into the second audio data comprises:
- convert the first audio data into third audio data, using a second transfer function of a microphone of the external electronic device; and
- convert the third audio data into the second audio data, using the first transfer function.

20. The non-transitory computer-readable media of claim 16, wherein the one or more instructions that, when executed, cause the at least one processor to:
- receive at least one of the first transfer function or a second transfer function from a server device, using a communication circuit.

* * * * *

UNITED STATES PATENT AND TRADEMARK OFFICE
CERTIFICATE OF CORRECTION

| | | |
|---|---|---|
| PATENT NO. | : 11,670,294 B2 | Page 1 of 1 |
| APPLICATION NO. | : 17/067903 | |
| DATED | : June 6, 2023 | |
| INVENTOR(S) | : Jaehoon Jeong et al. | |

It is certified that error appears in the above-identified patent and that said Letters Patent is hereby corrected as shown below:

On the Title Page

Item (30) should be added and shown as follows:
-- (30) Foreign Application Priority Date
October 15, 2019 (KR) ............................... 10-2019-0127992 --

Signed and Sealed this
Ninth Day of July, 2024

*Katherine Kelly Vidal*

Katherine Kelly Vidal
*Director of the United States Patent and Trademark Office*